US012368243B2

(12) United States Patent
Kambara et al.

(10) Patent No.: US 12,368,243 B2
(45) Date of Patent: Jul. 22, 2025

(54) ELECTROMAGNETIC WAVE REFLECTOR, REFLECTED ELECTROMAGNETIC WAVE FENCE, AND METHOD OF ASSEMBLING ELECTROMAGNETIC WAVE REFLECTOR

(71) Applicant: AGC Inc., Tokyo (JP)

(72) Inventors: Kumiko Kambara, Tokyo (JP); Koji Ikawa, Tokyo (JP)

(73) Assignee: AGC Inc., Tokyo (JP)

( * ) Notice: Subject to any disclaimer, the term of this patent is extended or adjusted under 35 U.S.C. 154(b) by 131 days.

(21) Appl. No.: 18/462,660

(22) Filed: Sep. 7, 2023

(65) Prior Publication Data

US 2023/0420864 A1 Dec. 28, 2023

Related U.S. Application Data

(63) Continuation of application No. PCT/JP2022/008544, filed on Mar. 1, 2022.

(30) Foreign Application Priority Data

Mar. 16, 2021 (JP) ................................ 2021-042117

(51) Int. Cl.
*H01Q 15/14* (2006.01)
*H01Q 1/12* (2006.01)
*H01Q 15/00* (2006.01)

(52) U.S. Cl.
CPC ............ *H01Q 15/142* (2013.01); *H01Q 1/12* (2013.01); *H01Q 15/0086* (2013.01)

(58) Field of Classification Search
CPC .... H01Q 1/12; H01Q 15/142; H01Q 15/0086; H01Q 15/141; H01Q 15/148; H01Q 15/0026; H01Q 15/14; H01Q 19/106; H01Q 19/104
See application file for complete search history.

(56) References Cited

U.S. PATENT DOCUMENTS

2022/0173521 A1* 6/2022 Wu ...................... H01Q 19/104
2023/0010669 A1* 1/2023 Kambara ............ H01Q 19/104
2023/0023706 A1* 1/2023 Kambara ................ H01Q 3/20

FOREIGN PATENT DOCUMENTS

EP 4 131 655 A1 2/2023
JP 1-233798 A 9/1989
JP 2004036215 A * 2/2004

(Continued)

OTHER PUBLICATIONS

Kwon et al., "Arbitrary beam control using passive lossless metasurfaces enabled by orthogonally polarized custom surface waves", Physical Review B 97, 2018, 11 pages.

*Primary Examiner* — Seokjin Kim
(74) *Attorney, Agent, or Firm* — Oblon, McClelland, Maier & Neustadt, L.L.P.

(57) ABSTRACT

The propagation of radio waves in indoor and outdoor mobile communications is improved. An electromagnetic wave reflector includes: a panel having a reflecting surface and configured to reflect a radio wave of a desired band selected from frequency bands ranging from 1 GHz to 170 GHz; and a support supporting the panel, and, in this electromagnetic wave reflector, the support has a conductive frame and a non-conductive cover that covers at least part of the frame, and the frame has a slit and a hollow, the slit receiving an end part of the panel, and the hollow being independent of the slit.

10 Claims, 17 Drawing Sheets

(56) References Cited

FOREIGN PATENT DOCUMENTS

| | | | | | |
|---|---|---|---|---|---|
| JP | 4892207 | B2 | * | 3/2012 | |
| JP | 2021114647 | A | * | 8/2021 | |
| WO | WO-2023218887 | A1 | * | 11/2023 | ............. H01Q 15/14 |

* cited by examiner (A) ANALYTICAL STRUCTURE 1

(B) ANALYTICAL STRUCTURE 2

(C) ANALYTICAL STRUCTURE 3

FIG.16

| | | ANALYTICAL STRUCTURE 1 | ANALYTICAL STRUCTURE 2 | ANALYTICAL STRUCTURE 3 |
|---|---|---|---|---|
| CROSS-SECTIONAL AREA : A | | 175 $mm^2$ | 7.6 $mm^2$ | 12.7 $mm^2$ |
| MOMENT OF INERTIA OF AREA : I | | 1416.1 $mm^4$ | 18128 $mm^4$ | 25597 $mm^4$ |
| SECTION MODULUS : Z | | 377.6 $mm^3$ | 2391 $mm^3$ | 2011 $mm^3$ |
| 50 kg | DEFLECTION DUE TO APPLIED LOAD : $\delta 1$ | 200.237 mm | 15.642 mm | 11.078 mm |
| | DEFLECTION DUE TO OWN WEIGHT : $\delta 2$ | 1.892 mm | 0.006 mm | 0.008 mm |
| | TOTAL DEFLECTION : $\delta$ | 202.129 mm | 15.649 mm | 11.086 mm |
| 90 kg | DEFLECTION DUE TO APPLIED LOAD : $\delta 1$ | 360.835 mm | 28.188 mm | 19.954 mm |
| | DEFLECTION DUE TO OWN WEIGHT : $\delta 2$ | 1.892 mm | 0.006 mm | 0.008 mm |
| | TOTAL DEFLECTION : $\delta$ | 362.728 mm | 28.195 mm | 19.962 mm |

ELECTROMAGNETIC WAVE REFLECTOR, REFLECTED ELECTROMAGNETIC WAVE FENCE, AND METHOD OF ASSEMBLING ELECTROMAGNETIC WAVE REFLECTOR

CROSS-REFERENCE TO RELATED APPLICATION

The present application is a continuation filed under 35 U.S.C. 111(a) claiming the benefit under 35 U.S.C. 120 and 365(c) of PCT International Application No. PCT/JP2022/008544, filed on Mar. 1, 2022, and designating the U.S., which is based on and claims priority to Japanese Patent Application No. 2021-042117, filed on Mar. 16, 2021. The entire contents of PCT International Application No. PCT/JP2022/008544 and Japanese Patent Application No. 2021-042117 are incorporated herein by reference.

BACKGROUND OF THE INVENTION

1. Field of the Invention

The present invention relates to an electromagnetic wave reflector, a reflected electromagnetic wave fence, and a method of assembling the electromagnetic wave reflector.

2. Description of the Related Art

The 5th generation mobile communication system (hereinafter referred to as "5G") achieves mobile communication with high-speed, large-capacity, low-delay, and multi-connectivity. 5G is expected to be applied not only to public mobile communication networks, but also to traffic control and automated driving using IoT (Internet of Things) technology, and to industrial IoT represented by "smart factories."

A joint structure of translucent electromagnetic wave shield plates to be used in buildings such as intelligent buildings has been proposed (see Patent Document 1, for example).

CITATION LIST

Patent Document

Patent Document 1: Japanese Patent No. 4892207

SUMMARY OF INVENTION

Technical Problem

While 5G is expected to provide high-speed, large-capacity communication, since the radio waves to be used travel rectilinearly, there may be places where these radio waves have difficulty reaching. In places where there are many machines made of metal such as in factories, and places where there are many reflections off the walls and roadside trees such as in a building district, a means to deliver radio waves to target terminal devices and wireless devices is necessary. There are similar concerns about places where non-line-of-sight (NLOS) spots from base station antennas are created, such as in medical sites, event venues, and large shopping facilities.

The present invention therefore aims to provide an electromagnetic wave reflector that improves the transmission of radio waves in indoor and outdoor mobile communications.

Solution to Problem

According to one aspect of the present disclosure, an electromagnetic wave reflector includes: a panel having a reflecting surface and configured to reflect a radio wave of a desired band selected from frequency bands ranging from 1 GHz to 170 GHz; and a support supporting the panel, and, in this electromagnetic wave reflector, the support has a conductive frame and a non-conductive cover that covers at least part of the frame, and the frame has a slit and a hollow, the slit receiving an end part of the panel, and the hollow being independent of the slit.

Advantageous Effects of Invention

The electromagnetic wave reflector configured as described above improves the propagation of radio waves in indoor and outdoor mobile communications.

BRIEF DESCRIPTION OF DRAWINGS

FIG. 16 is a diagram that shows results of strength analysis.

DETAILED DESCRIPTION OF THE PREFERRED EMBODIMENTS

Overview of the System

Figure 1:
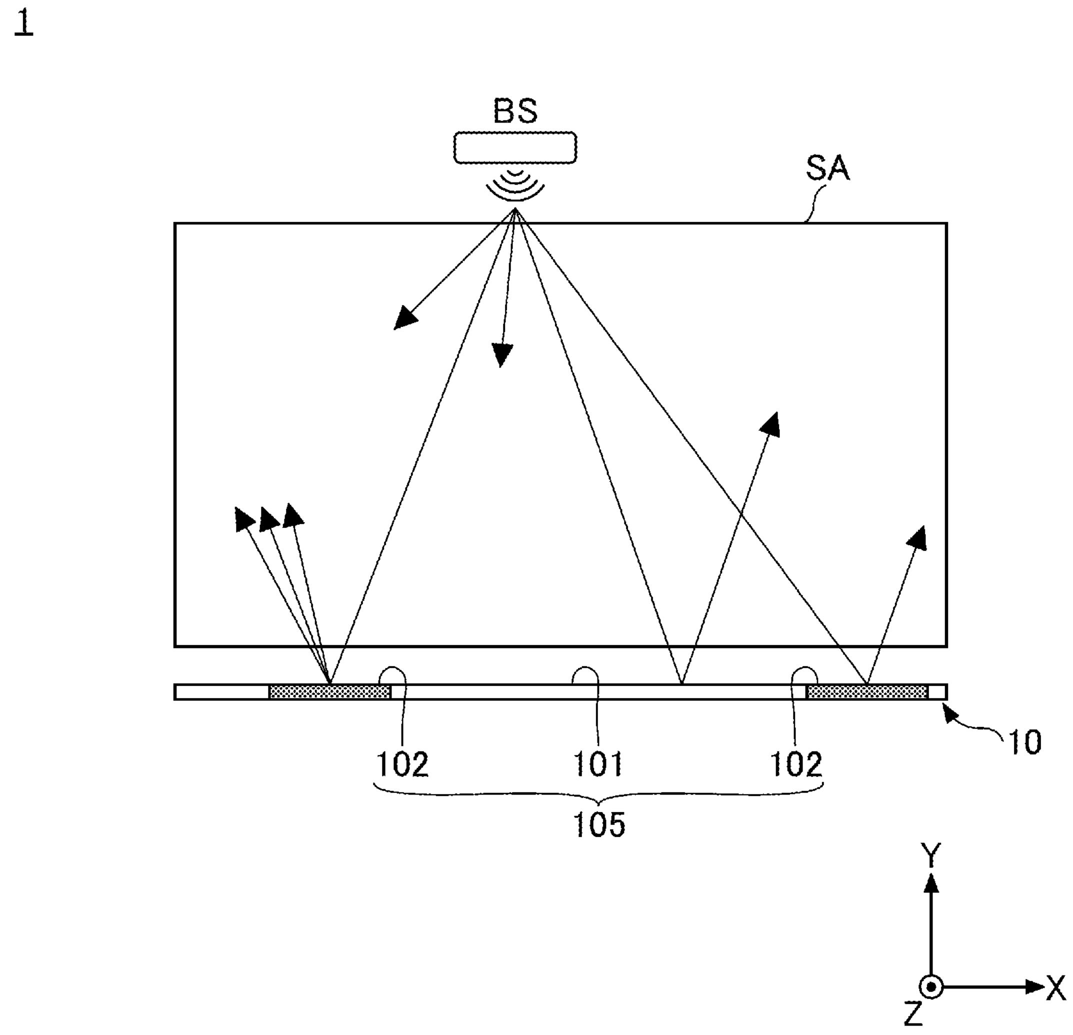
FIG. 1 is a schematic diagram that shows the propagation of radio waves in the event an electromagnetic wave reflector according to an embodiment is used.

FIG. 1 is a schematic diagram that shows the propagation of radio waves in the event an electromagnetic wave reflector 10 according to an embodiment is used. A radio wave is a kind of electromagnetic wave, and, generally, an electromagnetic wave equal to 3 THz or lower is called a radio wave. In the following description, electromagnetic waves that are emitted from a base station or a relay station will be referred to as “radio waves,” and, when referring to electromagnetic waves in general, the term “electromagnetic waves” will be used. In the drawings, the same elements may be assigned the same reference numerals, and overlapping description may be omitted.

The electromagnetic wave reflector 10 is placed in a service area SA, which is provided by a base station BS. In the space in which radio waves are transmitted and received to and from the base station BS, the height direction is defined as the Z direction, and the plane that is orthogonal to the Z direction is defined as the XY plane. The base station BS is installed indoors or outdoors, and service areas SA may be formed in streets, shopping malls, production lines in factories, event venues, and so forth.

The base station BS transmits and receives radio waves of a specific frequency band, for example, in the range of 1 GHz to 170 GHz. Radio waves that are emitted from the base station BS are reflected, shielded, and attenuated by building walls, roadside trees, and so forth. In factory production lines, radio waves are reflected, weakened, and shielded by structures such as devices, ducts, pipes, and so forth that are made of metal. High-frequency radio waves such as millimeter-band radio waves are strongly rectilinear and diffract little, and therefore might have difficulty reaching terminal devices in the service area SA.

The electromagnetic wave reflector 10 has a reflecting surface 105 that reflects radio waves of bands from 1 GHz to 170 GHz, and propagates the radio waves from the base station BS to terminal devices in the service area SA. The location where the electromagnetic wave reflector 10 is provided is by no means limited to the example of FIG. 1. The electromagnetic wave reflector 10 can be placed in an appropriate location depending on the location of the base station BS, the surrounding environment, the condition inside the service area SA, and so forth. For example, a number of electromagnetic wave reflectors 10 may be placed to face one another, or placed alternately, over the service area SA interposed therebetween. Multiple electromagnetic wave reflectors can also be joined together, as will be described later.

The reflecting surface 105 of the electromagnetic wave reflector 10 has at least one of a normal reflector 101 and a meta reflector 102. The normal reflector 101 gives normal reflection such that, when an incident electromagnetic wave arrives, its incident angle and reflection angle are equal. The meta reflector 102 has an artificial surface that controls the reflection properties of incident electromagnetic waves. A “meta reflector” is a type of “meta surface,” which refers to an artificial surface that controls the transmission and reflection properties of incident electromagnetic waves. The meta reflector 102 reflects electromagnetic waves in predetermined directions that are different from normal reflection, by controlling the distribution of reflected phases and the distribution of amplitudes by placing a large number of scatterers that are substantially smaller than the wavelength. The meta reflector 102 thus realizes not only reflection in directions that are different from normal reflection, but also realizes diffusion with a predetermined angular distribution, formation of wavefront, and so forth.

Figure 2A:
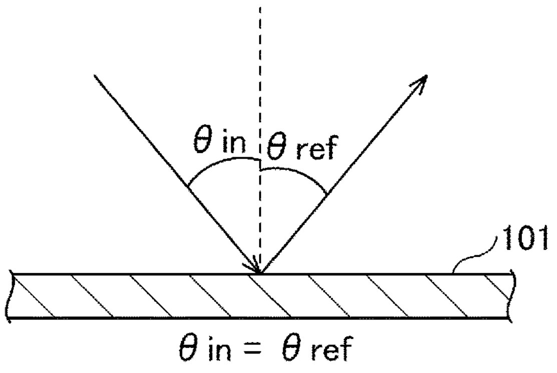
FIG. 2A is a diagram that explains reflection at a reflection angle that is the same as the incident angle.
Figure 2B:
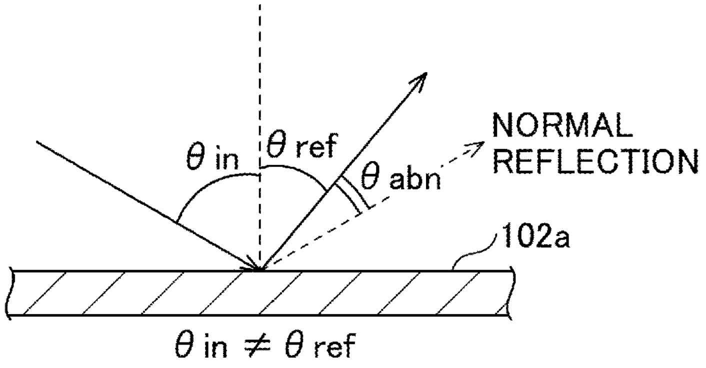
FIG. 2B is a diagram that explains reflection at a reflection angle that is different from the incident angle.
Figure 2C:
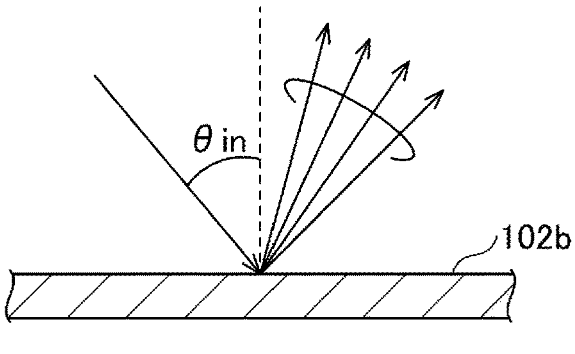
FIG. 2C is a diagram that explains diffusion in multiple directions.

FIG. 2A to FIG. 2C show examples of reflection on the reflecting surface 105 of the electromagnetic wave reflector 10. In FIG. 2A, an electromagnetic wave incident on the normal reflector 101 is reflected at a reflection angle θref that is the same as the incident angle θin. In FIG. 2B, an electromagnetic wave incident on the meta reflector 102*a* is reflected at a reflection angle θref that is different from the incident angle θin. The absolute value of the difference between the reflection angle θref by the meta reflector 102 and the reflection angle by normal reflection may be referred to as an “abnormal angle θabn.” As described above, by placing metal patches or the like that are substantially smaller than the wavelength used, on the surface of the meta reflector 102*a*, and thus forming a surface impedance thereon, it is possible to control the distribution of reflected phases and reflect incident electromagnetic waves in desired directions.

Electromagnetic waves to be reflected on the meta reflector 102 need not be plane waves with a single reflection angle. That is, in FIG. 2C, the surface impedance formed on the surface of the meta reflector 102*b* is controlled such that incident electromagnetic waves are diffused in multiple directions at multiple different reflection angles. As a technique for realizing the reflection of FIG. 2C, for example, the method described in PHYSICAL REVIEW B 97, “ARBITRARY BEAM CONTROL USING LOSSLESS METASURFACES ENABLED BY ORTHOGONALLY POLARIZED CUSTOM SURFACE WAVES” may be used. Electromagnetic waves that are diffused may all have uniform intensity, or may have intensity distributed over a predetermined range, depending on the direction of reflection.

Figure 3:
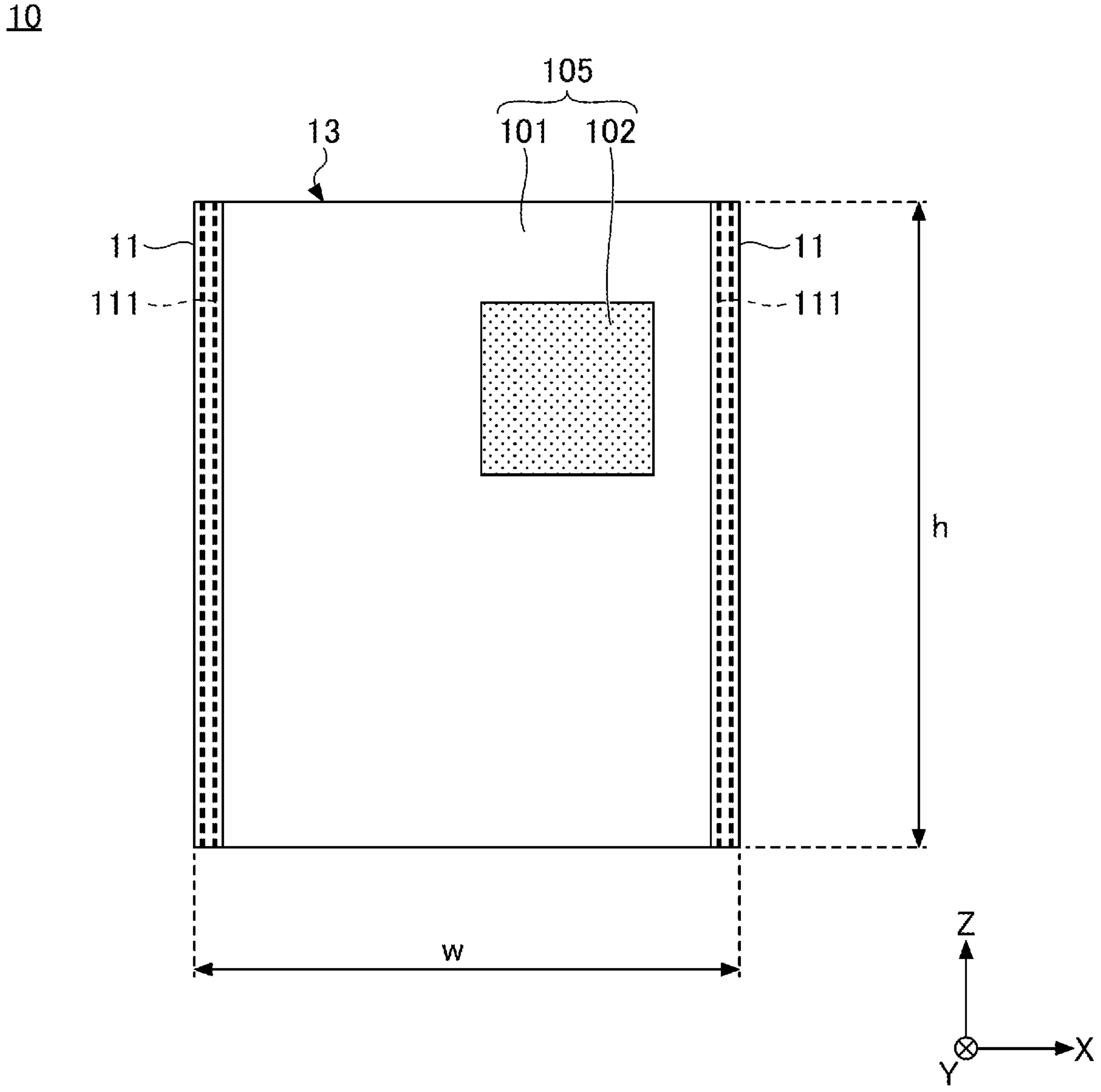
FIG. 3 is a schematic diagram that shows an electromagnetic wave reflector according to an embodiment.

Structures of Electromagnetic Wave Reflector and Reflected Electromagnetic Wave Fence FIG. 3 shows a basic structure of an electromagnetic wave reflector 10 according to an embodiment. The electromagnetic wave reflector 10 has a panel 13 that has a reflecting surface 105 where radio waves of a desired band, selected from the frequency band of 1 GHz to 170 GHz, are reflected, and a support 11 that supports the panel 13.

As described above, the reflecting surface 105 of the panel 13 is formed with at least one of the normal reflector 101 that provides normal reflection, and the meta reflector 102 that has an artificial surface for controlling the reflection properties of incident electromagnetic waves. The normal reflector 101 may include a reflecting surface made of an inorganic conductive material or a conductive polymer material.

The material, the shape of the surface, the manufacturing method, and the like of the meta reflector 102 are not limited as long as the meta reflector 102 can reflect incident electromagnetic waves in desired directions or diffuse them with a desired angular distribution. Generally, a meta surface is obtained by forming metal patches that are substantially smaller than the wavelength used, on the surface of a conductor such as metal, via a dielectric layer. The meta reflector 102 is formed so as to have desired reflection properties, depending on configuration parameters that control in which directions electromagnetic waves are reflected, and is placed at an appropriate position on the reflecting surface 105.

The size of the panel 13 can be appropriately designed according to the environment in which it is used. For example, the panel 13 has a width "w" of 0.5 m to 3.0 m, a height "h" of 1.0 m to 2.5 m, and a thickness "t" of 3.0 mm to 9.0 mm. Considering the transportation of the electromagnetic wave reflector 10 to its installation site and the ease of assembly, the size, i.e., w×h×t, of the panel 13 may be approximately 1.0 m×2.0 m×5.0 mm. Part of the panel 13 may be transparent to visible light.

The panel 13 is supported by the support 11. The support 11 has a frame 111 with enough mechanical strength to hold the panel 13 stably. The electromagnetic wave reflector 10 may be used alone, or multiple electromagnetic wave reflectors 10 may be joined together and used as a reflected electromagnetic wave fence. In addition to having mechanical strength, the frame 111 has a structure that is suitable for connecting the reflecting surfaces 105 of multiple panels 13. The specific structure of the frame 111 will be described later with reference to FIG. 5A and FIG. 5B.

When the electromagnetic wave reflector 10 is installed indoors or outdoors, it may be attached to a wall or the like with the support 11. As will be described later, the support 11 is formed in a light and thin shape, while having substantial strength, and therefore is suitable for installing the electromagnetic wave reflector 10 on a wall surface or the like. The panel 13 and the support 11 are detachable and can be transported to the installation site separately. The electromagnetic wave reflector 10 can be assembled at the installation site, and placed in a desired location.

Figure 4:
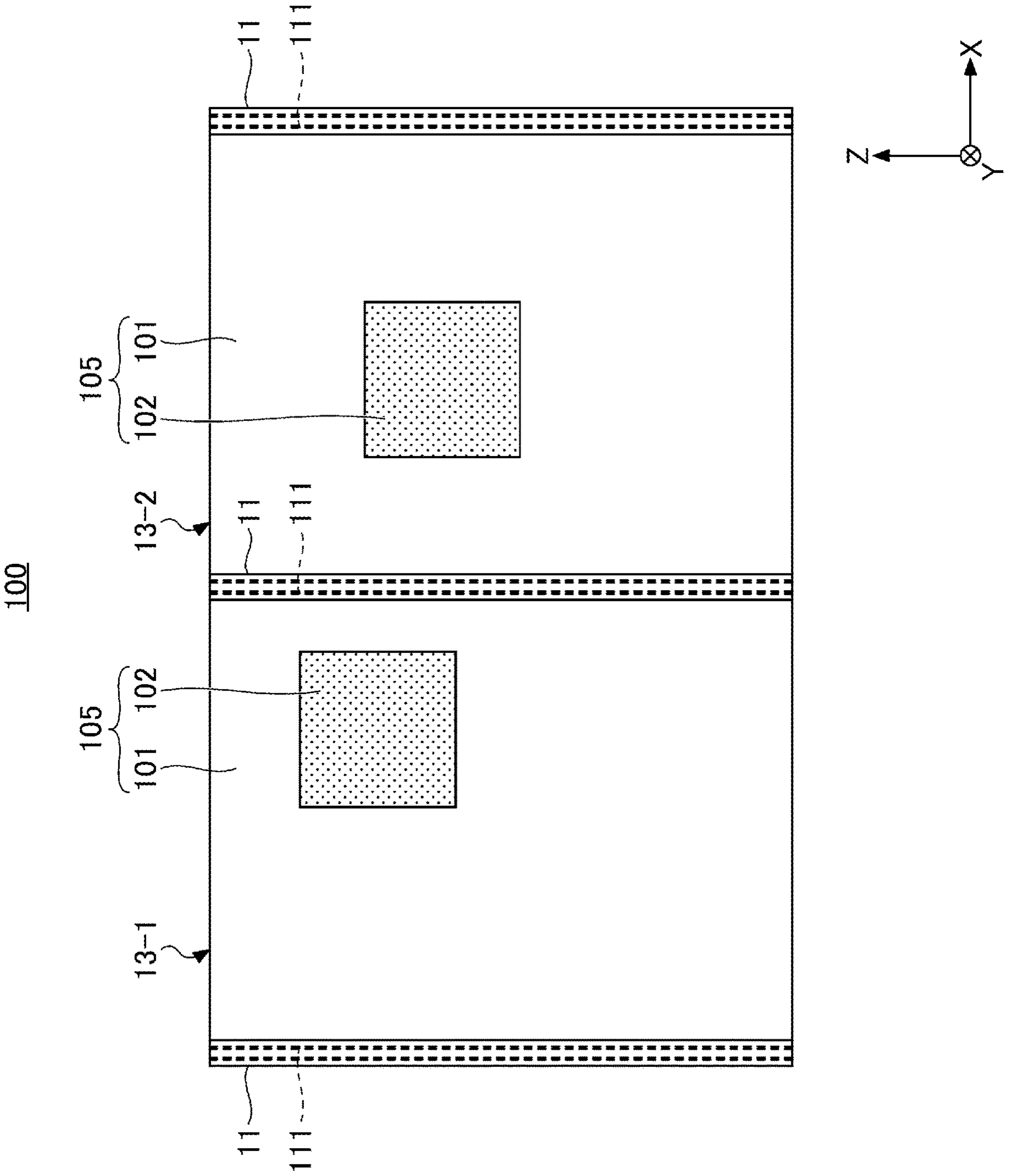
FIG. 4 is a schematic diagram that shows a reflected electromagnetic wave fence formed by connecting multiple panels.

FIG. 4 is a schematic diagram that shows a reflected electromagnetic wave fence 100, which is formed by connecting multiple electromagnetic wave reflectors 10. The reflected electromagnetic wave fence 100 is assembled by joining together a panel 13-1 and a panel 13-2 with supports 11. The supports 11 have frames 111 that hold the end parts of the panels 13-1 and 13-2. The frames 111 are structured such that the potential surface of reflection that occurs on the reflecting surface 105 of the panel 13-1 and the potential surface of reflection that occurs on the reflecting surface 105 of the panel 13-2 are continuous. When the panels 13-1 and 13-2 are joined together and used, if a reflected current produced by an incident electromagnetic wave is blocked between the adjacent panels 13-1 and 13-2, the reflected electromagnetic wave's energy is attenuated. Furthermore, if the reflected electromagnetic wave radiates in an undesirable direction, this might result in a decline in the quality of communication.

In order to ensure the continuity of reflected current between the adjacent panels 13-1 and 13-2, it is preferable if the reference potential of reflection is transmitted from one panel to the other panel, at a high frequency, via a support 11, and the reference potential that is produced by the phenomenon of reflection is shared between the adjacent panels. The number of panels 13 to be connected is by no means limited to two as long as the reference potential of reflection phenomenon is continuous between the adjacent panels 13-1 and 13-2, and three or more panels 13 may be joined together with supports 11. As mentioned earlier, the panels 13 and the supports 11 are detachable, and may be transported separately to the site of installation and assembled into the reflected electromagnetic wave fence 100. In that case, the end parts of the outermost panels of the connected panels 13 may be covered with protective jackets such as ones made of plastic, instead of the supports 11.

When joining multiple panels 13 together, it is desirable that the continuity of reflected current be as uniform as possible over the entire frame 111 of the support 11. Specific example structures of the support 11 will be described below.

Figure 5A:
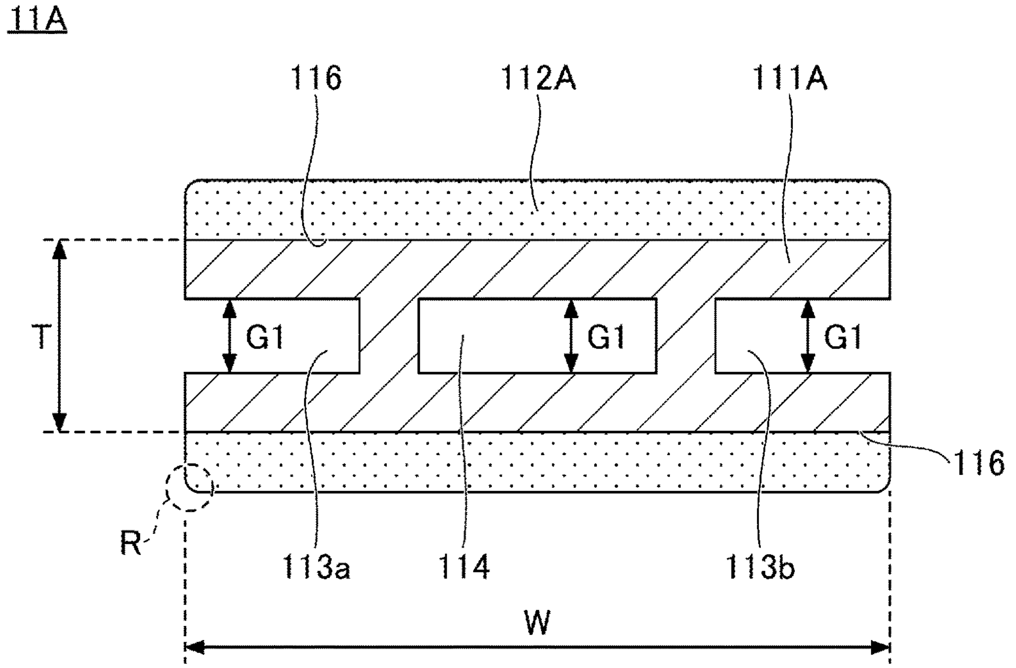
FIG. 5A is a diagram that shows an example structure of a support.

FIG. 5A is a schematic diagram that shows an example structure of a support 11A. The support 11A is a horizontal cross-sectional view, drawn along the thickness direction of the panel 13 that it supports. The support 11A has a frame 111A made of a conductor, and a non-conductive cover 112A covering at least part of the frame 111A.

For example, the frame 111A is made of highly conductive and lightweight aluminum here, but it may be made of other conductors such as titanium, graphite, a conductive carbon compound, and so forth. In the frame 111A, the direction that is parallel to the reflecting surface 105 of the panel 13 that is supported is the width (W) direction, and the direction that is parallel to the thickness of the panel 13 is the thickness (T) direction.

The horizontal cross-section of the frame 111A has a shape in which two shapes of the letter "H" are connected in series in the width (W) direction. The frame 111A has slits 113*a* and 113*b* for receiving the end parts of the panel 13, on both sides in the width direction. A hollow 114, which is independent from the slits 113*a* and 113*b*, is formed between the slits 113*a* and 113*b*. Being "independent" from the slits 113*a* and 113*b* means not communicating with either the slit 113*a* or 113*b*. The hollow 114 contributes to weight reduction of the frame 111A. Hereinafter, the slits 113*a* and 113*b* may simply be referred to as "slits 113" without distinguishing between the two. The surface of the frame 111A, located outside the inner part where the hollow 114 and the slits 113*a* and 113*b* are formed, is the outer surface 116 of the frame 111A.

The thickness of the frame 111A is designed such that the support 11A has substantial strength as a whole, as will be described later. Generally speaking, increasing the thickness of the frame 111A results in increased rigidity; however, when the frame 111A is too thick, it is difficult to achieve desired electromagnetic wave reflection properties or fulfill the requirements of being thin and lightweight. The thickness of the frame 111A is 1.0 mm to 10.0 mm, preferably 1.5 mm to 7.5 mm, more preferably 2.0 mm to 5.0 mm. In this specification, the use of "to" when indicating a range is intended to include the lowermost and uppermost values shown on both sides. By designing the thickness of the frame 111A in the above range, the frame 111A can have substantial rigidity without increasing its size, and a common reflection reference potential can be shared between adjacent panels 13.

As will be described later, the frame 111A having the slits 113*a* and 113*b* reliably hold the end parts of panels 13 by surface contact, and make the reflected potential on the reflecting surface 105 of one panel 13-1 and the reflected potential on the reflecting surface 105 of the other panel 13-2 continuous. When a reflected current is produced in one panel 13-1, the reflected current travels in the frame 111A, to the conductor constituting the reflecting surface 105 of the other panel 13-2. By using the frame 111A, which is formed by placing the shapes of the letter "H" in series, the reflected current flows in a short current path, so that little current wraps around, and excellent reflection performance is achieved.

The width W of the frame 111A is preferably 20 mm to 100 mm, more preferably 20 mm or more and 60 mm or less, from the perspective of holding adjacent panels 13 reliably and sharing a reflection potential surface between the adjacent panels 13. For example, the gap G1 of the slits 113*a* and 113*b* and the gap G1 of the hollow 114 are both 5.5 mm.

The non-conductive cover 112A is made of a non-conductive material that is transparent to the wavelength that is used. When a non-conductive material is "transparent" to the wavelength that is used, it means that 50% or more, preferably by 60% or more, and more preferably 70% of the electromagnetic waves of the target wavelength is transmitted. The cover 112A may be made of resin or synthetic resin such as polyvinyl chloride (PVC), acrylonitrile butadiene styrene (ABS), polyethylene terephthalate (PET), polyethylene naphthalate (PEN), polycarbonate (PC), acrylic resin, and polyimide (PI), or may be formed by using fiber-reinforced plastic or other insulating coating. By covering the outer surface 116 of the frame 111A with the non-conductive cover 112A, abnormal scattering on the outer surface of the support 11A can be prevented.

Both corner parts of the cover 112A in the width (W) direction may be chamfered with a predetermined radius of a curvature R. The cover 112A may be bonded to the outer surface 116 of the frame 111A with an adhesive or the like, or may be molded in one piece with the frame 111A by using a mold. The cover 112A may also be an adhesive layer. The radius of curvature R is, for example, 1 mm or more, preferably 2 mm or more, more preferably 4 mm or more.

Figure 5B:
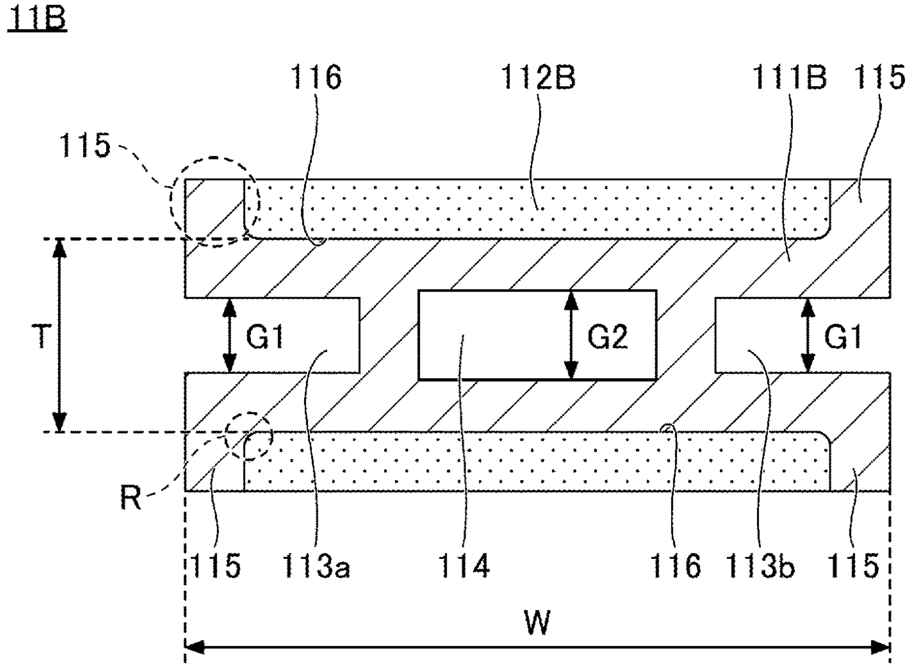
FIG. 5B is a diagram that shows another example structure of a support.

FIG. 5B is a schematic diagram that shows an example structure of a support 11B. A horizontal cross-sectional view of the support 11B is drawn along the thickness direction of the panel 13 that is supported. The support 11B has a frame 111B made of a conductor, and a non-conductive cover 112B that covers at least part of the frame 111B.

Like the frame 111A of FIG. 5A, the frame 111B is made of a material that has high electrical conductivity and is lightweight such as aluminum, but it may be made of other conductors such as titanium, graphite, a conductive carbon compound, and so forth. In the frame 111B, the direction that is parallel to the reflecting surface 105 of the panel 13 that is supported is the width (W) direction, and the direction that is parallel to the thickness of the panel 13 is the thickness (T) direction.

Like the frame 111A, the frame 111B has a horizontal cross-sectional shape in which two shapes of the letter H are connected in series in the width (W) direction, and, in addition, the frame 111B has wings 115 that extend outward from the slits 113*a* and 113*b* at both ends in the width (W) direction. The hollow 114 formed in the center of the frame 111B contributes to weight reduction of the frame 111B. For example, the gap G1 of the slits 113*a* and 113*b* is mm, and the gap G2 of the hollow 114 is 6.0 mm. The thickness of the frame 111B including the wings 115 is 1.0 mm to 5.5 mm, preferably 2.0 mm to 5.0 mm. By providing the frame 111B with the wings 115, the rigidity of the frame 111B increases compared to the structure of FIG. 5A, and the overall mechanical strength of the support 11B improves. Furthermore, since the wings 115 ensure rigidity, the gap G2 of the hollow 114 is made wider than in the frame 111A of FIG. 5A.

The non-conductive cover 112B covers the outer surface 116 between a pair of wings 115 that extend on both sides of the frame 111B in the width (W) direction. The corner parts of the frame 111B where the wings are erect may be chamfered with a predetermined radius of a curvature R. In this case, the corners of the cover 112B located between the wings 115 are also chamfered with the same radius of curvature R. In the structure of FIG. 5B, the non-conductive cover 112B may be bonded to the frame 111B with an adhesive or the like, or the cover 112B and the frame 111B may be formed in one piece, and still, in either case, enhanced adhesion can be achieved. The cover 112B itself may be an adhesive layer.

Both the support 11A of FIG. 5A and the support 11B of FIG. 5B support the panels 13 with substantial strength by holding the end parts of the panels 13 in the slits 113 formed in the frame 111, so that reflected current or the reference potential of reflection can be shared in common between adjacent panels.

Figure 6A:
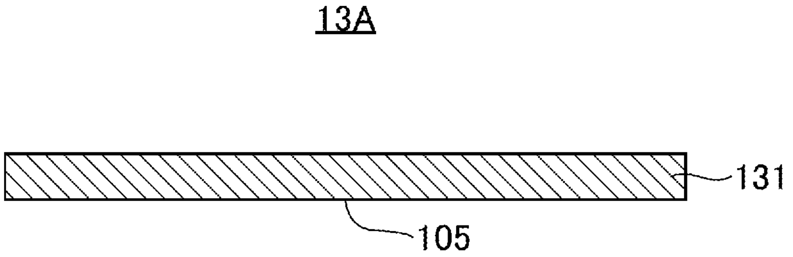
FIG. 6A shows an example structure of a panel.

FIG. 6A to FIG. 6D show example structures of the panel 13. In FIG. 6A, a panel 13A has a reflecting surface 105 of a conductor 131. The reflecting surface 105 may be structured in any way as long as it reflects 1 GHz to 170 GHz electromagnetic waves. For example, the reflecting surface 105 can be made of a mesh conductor, a conductive film, a combination of a transparent resin and a conductor film, and the like, that reflects electromagnetic waves of any frequency band selected from the range of 1 GHz to 170 GHz.

By designing the reflecting surface 105 to reflect the radio waves of desired frequency bands from 1 GHz to 170 GHz, it is possible to cover the 1.5 GHz band, the 2.5 GHz band, and so forth, which are the major frequency bands presently used in mobile communications in Japan. The 4.5 GHz band, the 28 GHz band, and so forth are planned for the next-generation 5G communication network. In foreign countries, the 2.5 GHz band, the 3.5 GHz band, the 4.5 GHz band, the 24 to 28 GHz band, the 39 GHz band, and so forth are planned for 5G frequency bands. It also becomes possible to support 52.6 GHz, which is the upper limit of 5G-standard millimeter wave bands. If indoor mobile communication in the terahertz band is realized in the future, the reflection band of the reflecting surface 105 may be extended to the terahertz band by applying photonic crystal technology or the like.

The conductor 131 does not have to be a homogeneous conductor film as long as it can reflect 30% or more of 1 GHz to 170 GHz radio waves. For example, the conductor 131 may be a mesh or lattice formed with such a density as to reflect the electromagnetic waves of the above frequency bands, or the conductor 131 may be an array of holes. The pitch of repetition, which relates to how densely desired electromagnetic waves are reflected, may have a uniform period or a non-uniform period. The period of repetition or the average period is preferably ⅕ or less, more preferably 1/10 or less, of the wavelength of the target frequency.

Figure 6B:
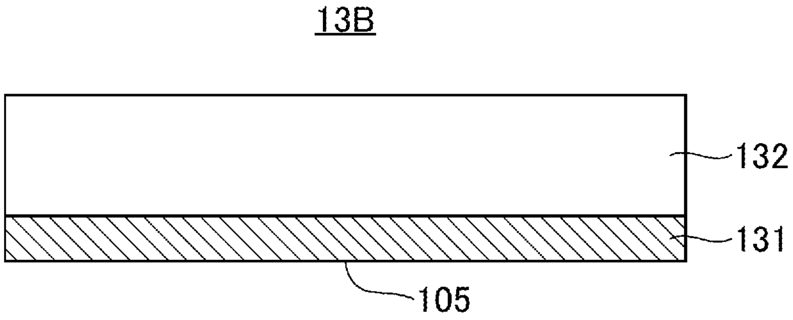
FIG. 6B shows another example structure of a panel.

FIG. 6B shows an example structure of a panel 13B. The panel 13B is a normal reflector, and has a structure in which a conductor 131 and a dielectric 132, which is transparent to the operating frequency, are laminated. One surface of the conductor 131 serves as the reflecting surface 105. When an electromagnetic wave is incident from the conductor 131 side, the interface between the conductor 131 and air becomes the reflecting surface 105. When an electromagnetic wave is incident from the dielectric 132 side, the interface between the conductor 131 and the dielectric 132 becomes the reflecting surface 105.

It is desirable if the dielectric 132, which holds the conductor 131 or covers the surface of the conductor 131, has rigidity to withstand vibration and satisfies the safety requirement under ISO014120 of ISO (International Organization for Standardization). When the panel 13B is used outdoors or in a factory, the dielectric 132 is preferably able to withstand the impact and protect itself even when hit by an object. Moreover, the dielectric 132 is preferably transparent in the range of visible light. For example, optical plastic, reinforced plastic, reinforced glass, or the like having a certain level of strength or more may be used. As optical plastic, polycarbonate (PC), polymethylmethacrylate (PMMA), polystyrene (PS), and the like may be used.

Figure 6C:
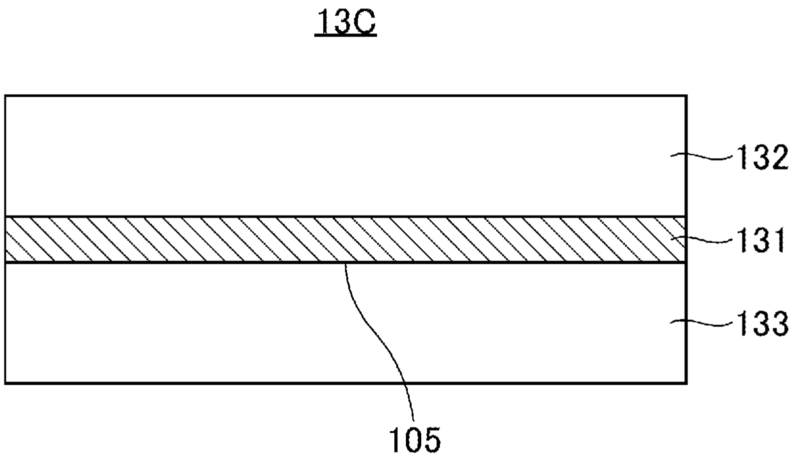
FIG. 6C shows yet another example structure of a panel.

FIG. 6C shows an example structure of a panel 13C. The panel 13C has a conductor 131 that is sandwiched between a dielectric 132 and a dielectric 133. The interface between the conductor 131 and one dielectric becomes the reflecting surface 105, depending on the incident direction of electromagnetic waves. The rigidity required for the dielectrics 132 and 133 is the same as in the structure of FIG. 6B.

Figure 6D:
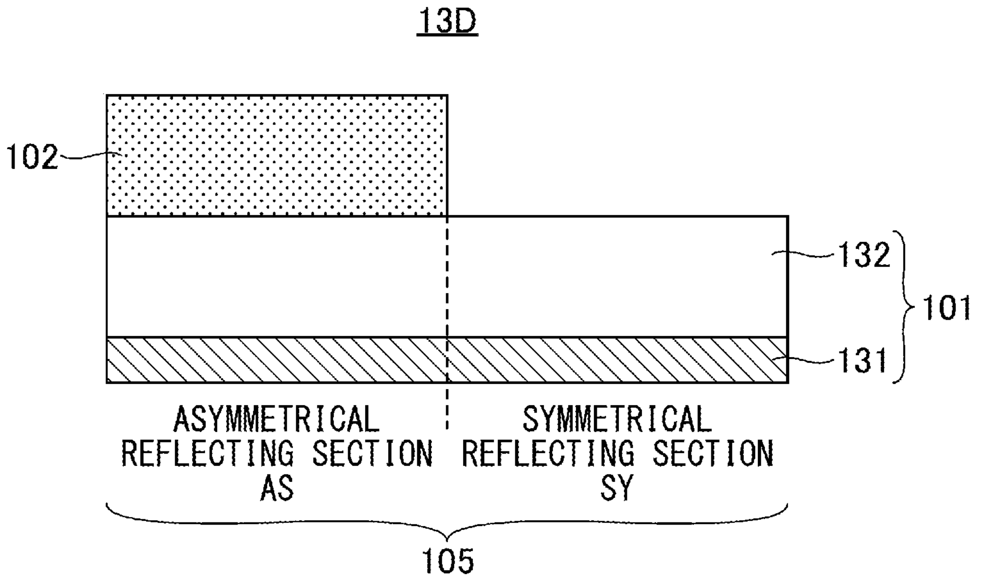
FIG. 6D shows yet another example structure of a panel.

FIG. 6D shows an example structure of a panel 13D. The meta reflector 102 may be provided in a part of the laminate of FIG. 6B. The laminate of the conductor 131 and the dielectric 132 can be used as the normal reflector 101. The meta reflector 102 may be fixed to the surface of the dielectric 132 of the normal reflector 101 by bonding or the like. The three-layer structure section of the conductor 131, dielectric 132 and meta reflector 102 can be an asymmetrical reflecting section AS that serves as a meta surface. The two-layer structure section of the conductor 131 and the dielectric 132, not including the meta reflector 102, can serve as a symmetrical reflecting section SY that provides normal reflection.

When the panels 13A to 13D of FIG. 6A to FIG. 6D are held by the support 11A or 11B, the conductor 131 is electrically connected with the frame 111A or 111B, and the reflection's potential is transmitted to the adjacent panels 13.

Figure 7:
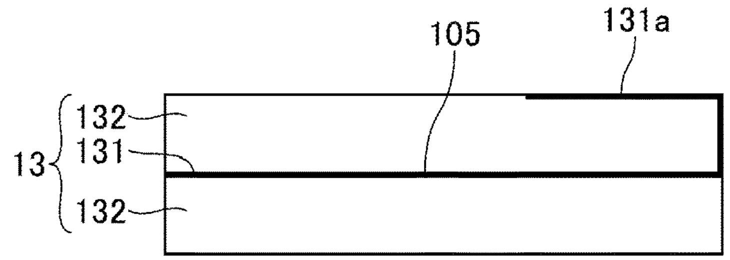
FIG. 7 is a diagram that shows edge processing of a panel.

FIG. 7 shows an example of processing of the conductor 131 at the end part of a panel 13. Although FIG. 7 shows the structure of the panel 13C of FIG. 6C, the processing applies to the panel 13B of FIG. 6B and the panel 13D of FIG. 6D as well. The conductor 131 may be routed beyond the end part of the dielectric 132, folded back at the end part of the panel 13, and cover at least part of the surface of one dielectric 132. When the end part of the panel 13 is inserted in a slit 113 of the frame 111 of the support 11, the folded part 131*a* of the conductor 131 comes into surface contact with the inner wall of the slit 113. By drawing out the conductor 131 to the surface of the panel 13 at the folded part 131*a*, the contact area between the conductor 131 and the slit 113 increases, and the electrical connection is stabilized.

Figure 8:
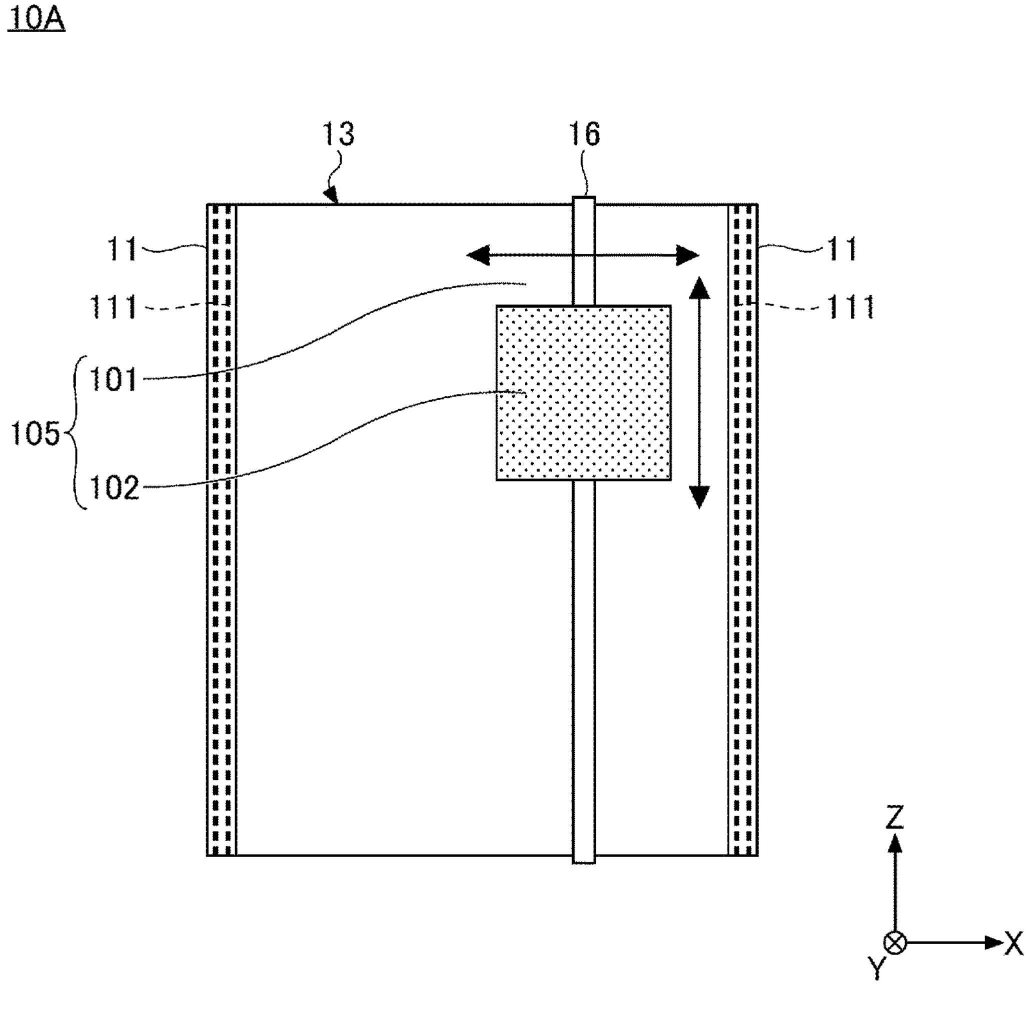
FIG. 8 shows a modification of an electromagnetic wave reflector.

FIG. 8 shows an electromagnetic wave reflector 10A as a modification of the electromagnetic wave reflector 10. The electromagnetic wave reflector 10A has a meta reflector 102 that can move on the panel 13. The meta reflector 102 may be integrated with the panel 13D so as to form one piece with the normal reflector 101 as shown in FIG. 6D, or may be configured to be capable of moving on the reflecting surface 105 as shown in FIG. 8.

The structure to make the position of the meta reflector 102 variable on the reflecting surface 105 may be configured in any way as long as the interference between the meta reflector 102 and the reflecting surface 105 is reduced. For example, it is possible to attach a rod 16, which holds the meta reflector 102, such that the rod 16 can slide in the horizontal direction of the panel 13. Also, the position of the meta reflector 102 may be held such that it is able to move vertically on the rod 16.

The rod 16 may be made of a non-metallic, low-dielectric-constant material that does not interfere with the reflection properties of the normal reflector 101 or the meta reflector 102. The rod 16 may be designed such that the optical and mechanical interference at the panel interface is zero or minimal. The meta reflector 102 can be moved to an optimal position on the panel 13 according to the environment of the site where the electromagnetic wave reflector 10A is placed, the positional relationship with respect to the base station BS, and so forth. As illustrated in FIG. 5A or FIG. 5B, the support 11 has slits 113*a* and 113*b* and a hollow 114, so that the reference potential of the reflection phenomenon that occurs on the reflecting surface 105 can be transmitted to the reflecting surface of an adjacent panel 13.

Figure 9A:
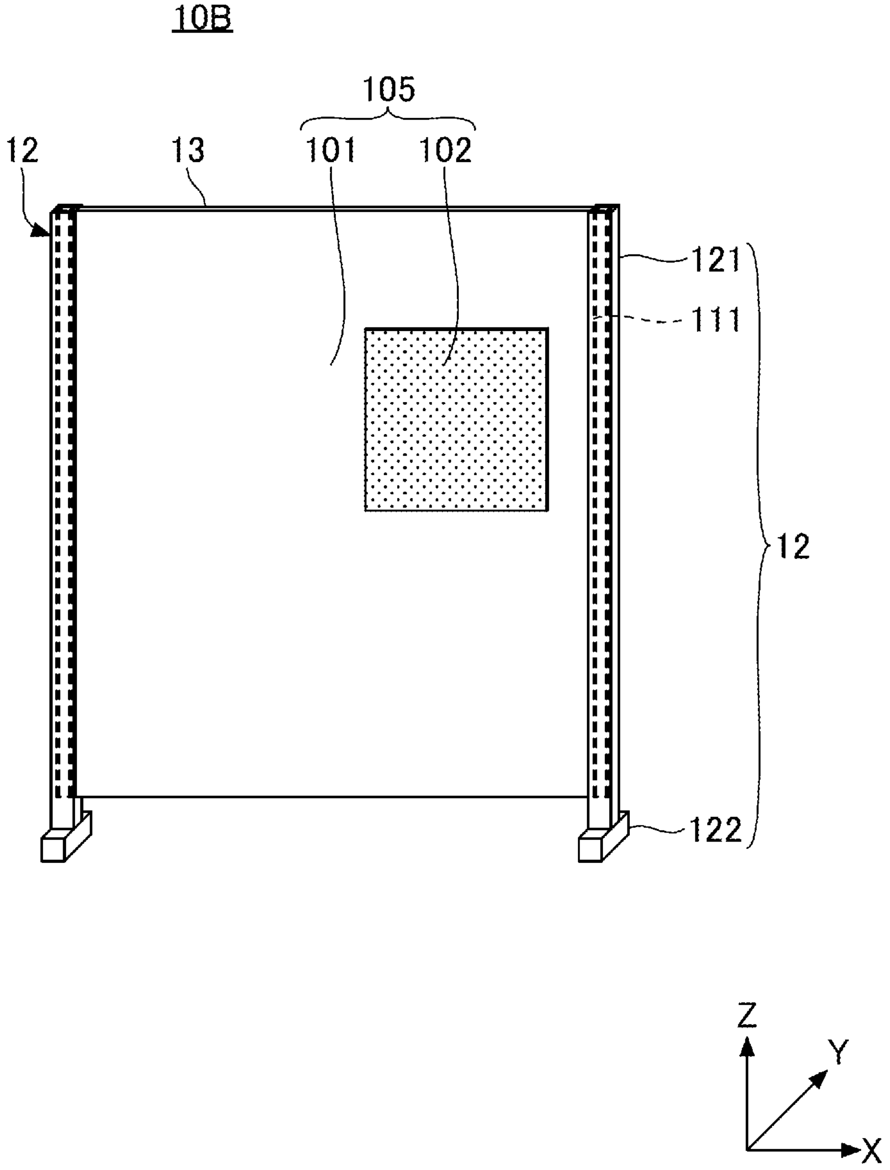
FIG. 9A shows another modification of an electromagnetic wave reflector.

FIG. 9A shows an electromagnetic wave reflector 10B as another modification of the electromagnetic wave reflector 10. The electromagnetic wave reflector 10B is a freestanding one. The electromagnetic wave reflector 10B has a panel 13 that has a reflecting surface 105, and supports 12 that support the panel 13.

Each support 12 has a base 122 and a pillar 121 that extends vertically from the base 122. The cross-sectional shape of the pillar 121, cut along a plane parallel to the XY plane, is shown in FIG. 5A or FIG. 5B. The pillar 121 has a frame 111 with slits 113 and a hollow 114, and a non-conductive cover 112 that covers at least part of its outer surface 116.

The panel 13 and the supports 12 of the electromagnetic wave reflector 10B are also separable, and can be assembled at the site where the electromagnetic wave reflector 10B is installed. When assembling, the end parts of the panel 13 are inserted in the slits 113 of the supports 12, so that the electromagnetic wave reflector 10B stands on its own. Since the electromagnetic wave reflector 10B is freestanding, it can be placed anywhere indoors or outdoors, and also used as a partition, a fence, or the like that has a radio wave reflection function.

In the case of the freestanding electromagnetic wave reflector 10B shown in FIG. 9A, braces may be provided on the panel 13 surface that is opposite from the reflecting surface 105, in order to reinforce the strength of the panel 13. The braces may be strung diagonally between the supports 12 holding both ends of the panel 13. Alternatively, a reinforcing beam may be provided at the top or bottom of the panel 13.

Figure 9B:
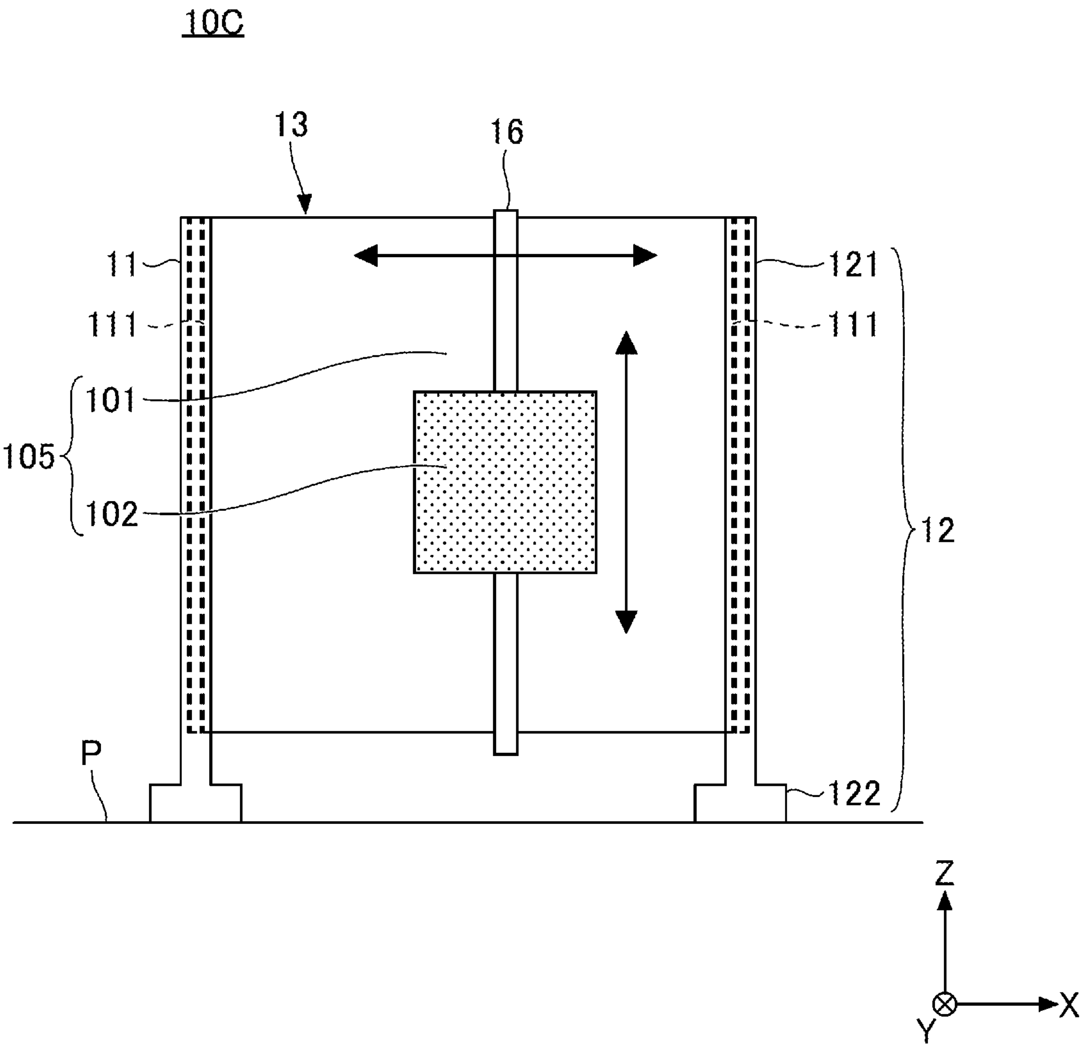
FIG. 9B shows another modification of an electromagnetic wave reflector.

FIG. 9B shows an electromagnetic wave reflector 10C as yet another modification of the electromagnetic wave reflector 10. The electromagnetic wave reflector 10C is freestanding as in FIG. 9A, and each support 12 has a base 122 and a pillar 121 that extends from the base 122. The pillar 121 has a frame 111 that holds an end part of the panel 13.

A meta reflector 102 is provided on the panel 13 in a movable fashion. The structure to allow the meta reflector 102 to move may be configured in any way as long as it does not interfere with the reflecting surface 105. Here, similar to FIG. 8, on the panel 13, a rod 16 that can move horizontally, as indicated by the double-headed arrow, is used, and the meta reflector 102 is attached to the rod 16 such that the meta reflector 102 can move vertically (in the Z direction). By selecting the position of the meta reflector 102 on the panel 13 according to the surrounding environment, the position of the asymmetrical reflecting section AS (see FIG. 6D) can be adjusted.

Figure 9C:
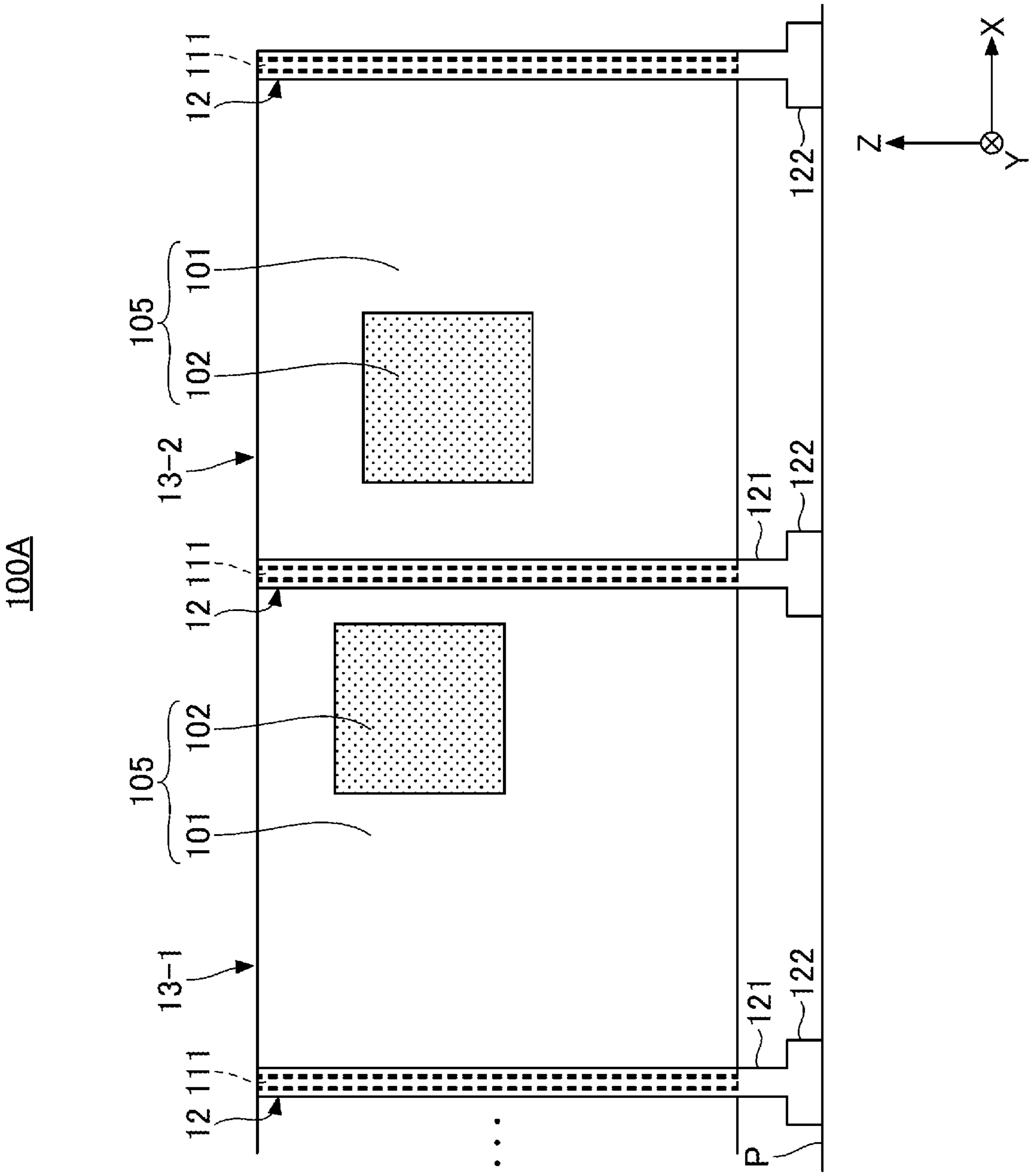
FIG. 9C shows a modification of a reflected electromagnetic wave fence formed by joining multiple panels together.

FIG. 9C shows a reflected electromagnetic wave fence 100A, which is a variation of the reflected electromagnetic wave fence. The electromagnetic wave fence 100A has a structure, in which multiple electromagnetic wave reflectors 10B are connected, and in which the panels 13-1 and 13-2 are joined together by means of supports 12. The supports 12 allow the panels 13-1 and 13-2 to be erect substantially vertically with respect to the XY plane, by means of the bases 122. The frames 111 of the pillars 121 hold the end parts of the panels 13-1 and 13-2, so that the potential surface of reflection that occurs on the reflecting surface 105 of the panel 13-1 and the potential surface of reflection that occurs on the reflecting surface 105 of the panel 13-2 become continuous. Instead of the electromagnetic wave reflectors 10B, the electromagnetic wave reflectors 10C of FIG. 9B may be connected and form a reflected electromagnetic wave fence. In either case, it is possible to transport the panels 13 and the supports 12 to the installation site separately, and assemble the fence there. In the event the electromagnetic wave reflectors 10C are used, the position of the meta reflector 102 may be determined while or after the reflected electromagnetic wave fence is assembled.

Also, in the structure of FIG. 9C, one or both of the panels 13-1 and 13-2 may be provided with reinforcing braces, reinforcing beams, or the like. By making multiple continuous panels stand on their own, they can be used as a partition at an event venue, a defensive fence for a production line, and so forth.

Evaluation of Supports

Now, the reflection properties of the supports 11 (including the supports 12) will be described below. The reflection properties are evaluated based on the peak ratio of radar cross-sections. That is, the peak ratio is the ratio of the peak intensity of the radar cross-section when the frames 111 are used, to the peak intensity of the radar cross-section of one panel without the frames 111.

Figure 10:
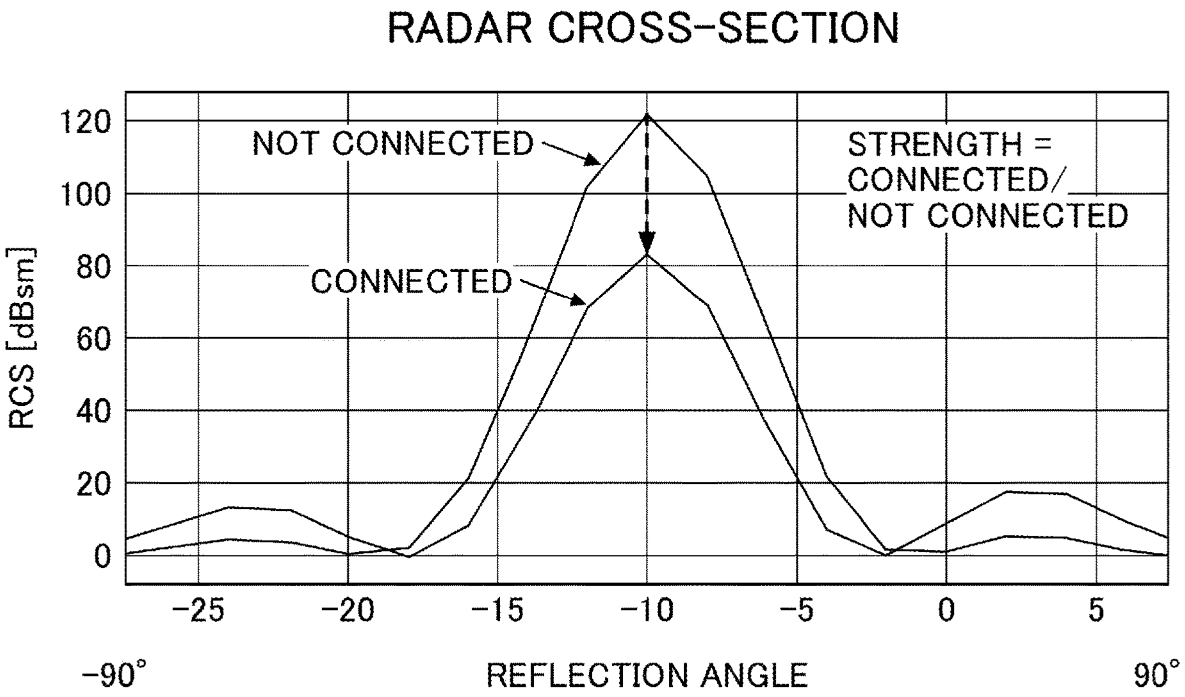
FIG. 10 is a diagram that explains a method of evaluating reflection properties.

FIG. 10 is a diagram that explains a method of evaluating reflection properties. The ability to reflect incident electromagnetic waves is measured based on the radar reflection cross-section (RCS), that is, the radar cross-section. The unit of measurement for RCS is decibels per square meter (dBsm). By connecting two panels electrically via a conductive frame 111, the main peak intensity of RCS becomes lower than when a single panel is used. On the other hand, the peak ratio is the ratio of the main peak intensity of RCS when a frame 111 is used (shown as "connected" in the drawing), to the main peak intensity of RCS when a single panel is used (shown as "not connected" in the drawing). The higher the peak ratio, the less the peak intensity drops, and the better the reflection properties. The peak ratio is 0.4 or higher, preferably 0.5 or higher, more preferably 0.6 or higher, still more preferably 0.7 or higher. In the evaluation, plane waves of predetermined frequencies are reflected on a panel surface, and the radar cross-section is analyzed by using general-purpose three-dimensional electromagnetic field simulation software.

Figure 11:
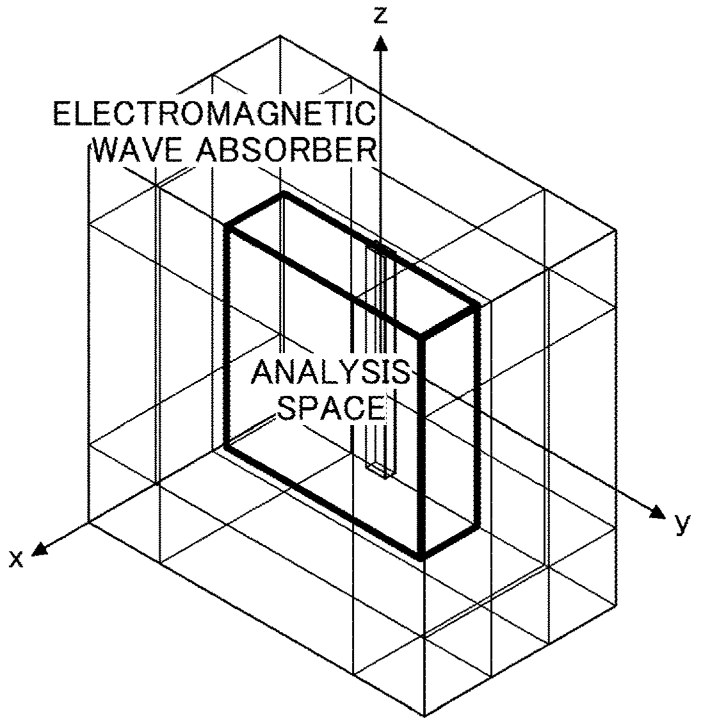
FIG. 11 is a diagram that explains a space for analyzing reflection properties.
Figure 12:
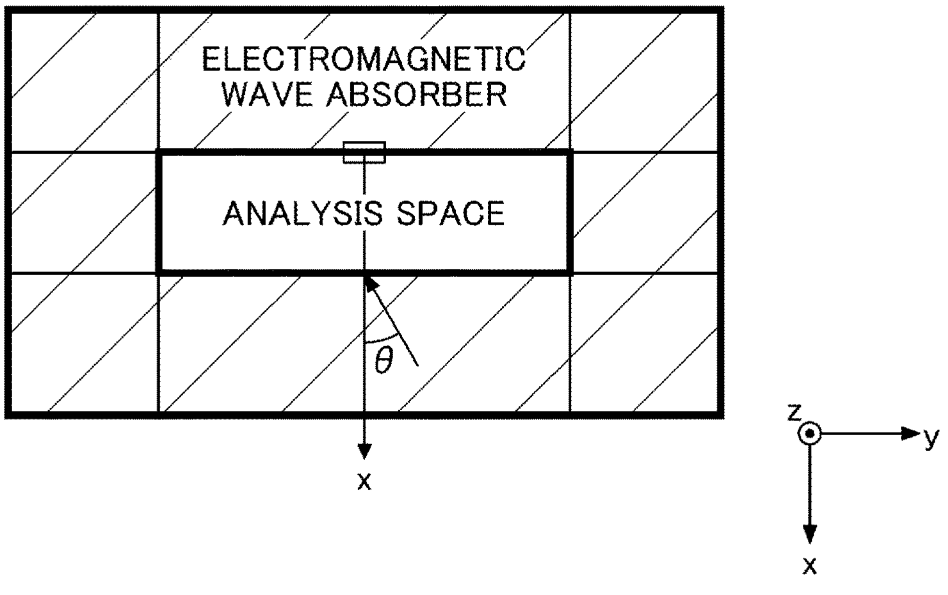
FIG. 12 is a diagram that explains a space for analyzing reflection properties.

FIG. 11 and FIG. 12 are diagrams for explaining the space for analyzing the reflection properties of embodiments and comparative examples, which will be described below. In FIG. 11 and FIG. 12, the thickness direction of the panel 13 is the x direction, the width direction is the y direction, and the height direction is the z direction. The analysis space is therefore represented by: (the size in the x direction)×(the size in the y direction)×(the size in the z direction). The size of the analysis space when the frequency is 2 to 15 GHz is 150 mm×500 mm×500 mm. The size of the analysis space when the frequency is 28 GHz is 100 mm×200 mm×200 mm. The reason the analysis space becomes smaller at higher frequencies is that the wavelength is shorter. As shown in FIG. 12, the boundary conditions are designed such that an electromagnetic wave absorber is placed to enclose the analysis space.

Figure 13A:
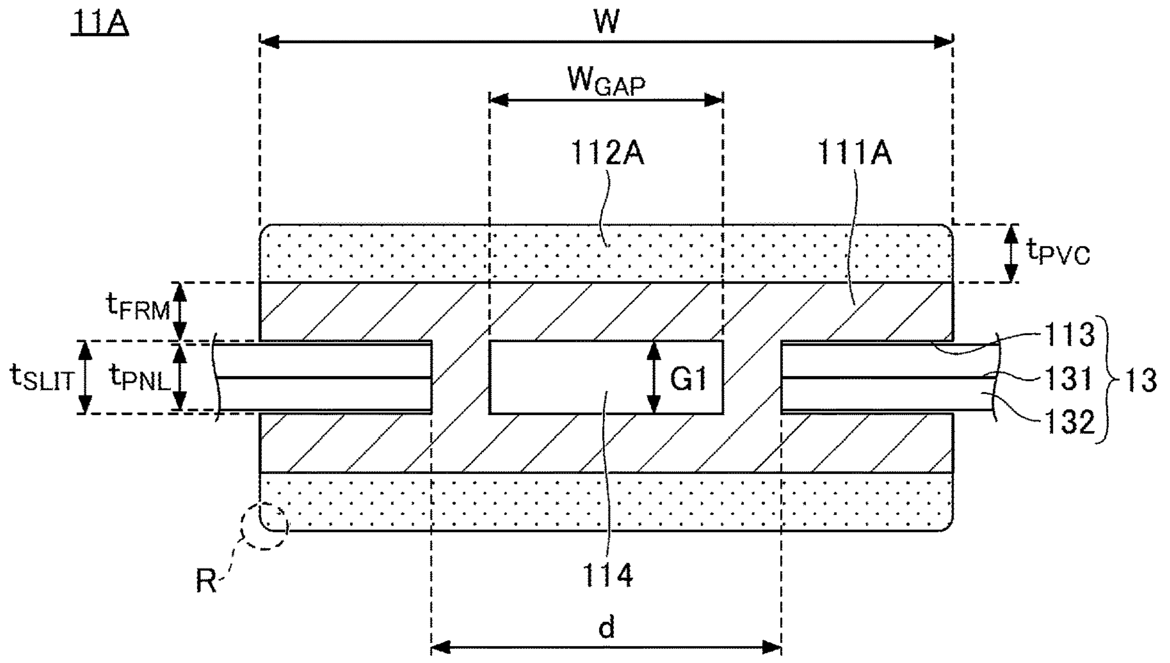
FIG. 13A is a diagram that shows a simulation model of the structure of FIG. 4.
Figure 13B:
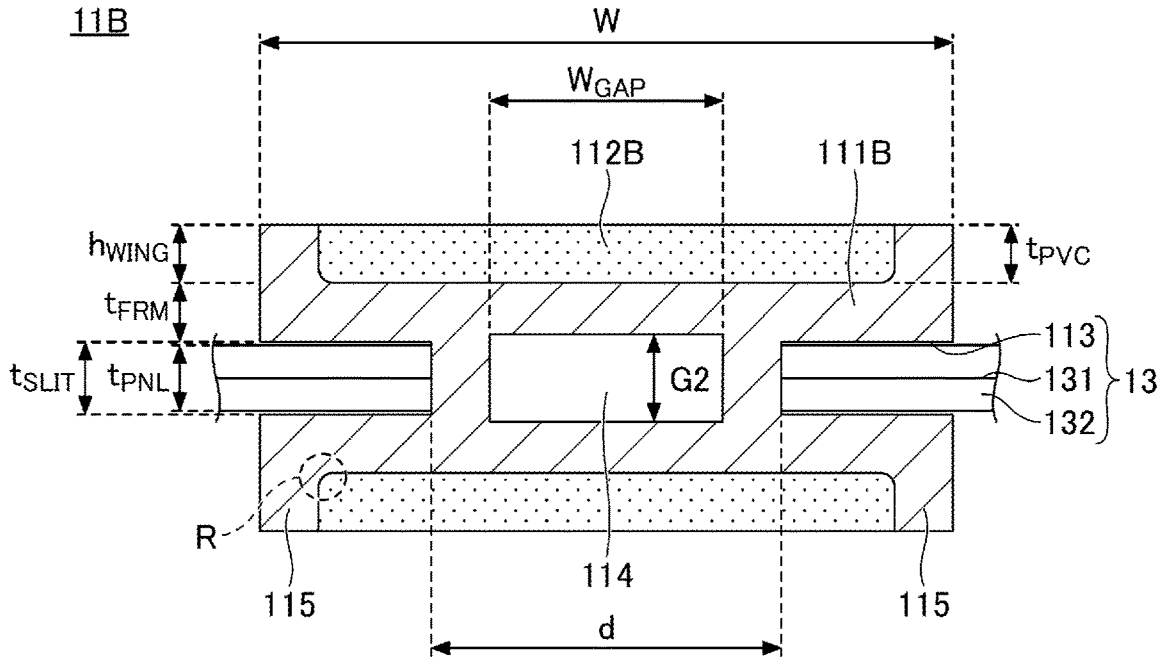
FIG. 13B is a diagram that shows a simulation model of the structure of FIG. 5.

FIG. 13A and FIG. 13B are diagrams of simulation models used in embodiments. FIG. 13A illustrates the support 11A of FIG. 5A, and FIG. 13B illustrates the support 11B of FIG. 5B. The panel 13 has a structure, in which a conductor 131 is sandwiched and bonded between two dielectrics 132 and 133. While the actual panel may employ a structure in which a conductor mesh is used as the conductor 131 and its end part is folded back as shown in FIG. 7, these simulation models are structured such that the conductor 131 is simply sandwiched between two dielectrics 132. In both FIG. 5A and FIG. 5B, a polycarbonate that is 2.5-mm thick is used as the dielectric 132 and as the dielectric 133, and the conductor 131 that is provided between the two polycarbonates is SUS. The total thickness of the panel 13, "$t_{PNL}$," is 5.0 mm.

In FIG. 5A, the frame 111A is made of aluminum, and its thickness "$t_{FRM}$" is 5.0 mm and width "W" is 60 mm. The size of the slits, "$t_{SLIT}$," is 5.5 mm. The width of the hollow 114, "$W_{GAP}$," is 20 mm, and the gap G1 is 5.5 mm. The distance "d" between the slits in the width direction is 30 mm. That is, there is a 5 mm-thick aluminum wall between the hollow 114 and each slit. The non-conductive cover 112A is made of PVC, its thickness "$t_{PVC}$" being 5.0 mm, and the radius of curvature R of the edges of the cover 112A being 2 mm.

In FIG. 5B, the frame 111B is made of aluminum, where the thickness of the entire frame 111, "$t_{FRM}$," including the wings 115, is 5.0 mm, and the width "W" is 60 mm. The height "$h_{WING}$" of the wings 115, projecting from both ends of the frame 111B in the width direction, is 5.0 mm. The size of the slits, "$t_{SLIT}$," is 5.5 mm, the gap G2 of the hollow 114 is 6.0 mm, the width of the hollow 114, "$W_{GAP}$," is 20 mm, and the distance "d" between the slits in the width direction is 30 mm. As illustrated in FIG. 5A, there is a 5 mm-thick aluminum wall between the hollow 114 and each slit. The non-conductive cover 112B, placed between the wings 115, is made of PVC, its thickness "$t_{PVC}$" and width being 5 mm and 50 mm, respectively. The radius of curvature R of the inner edges of the cover 112B is 2 mm.

Using the simulation models of FIG. 13A and FIG. 13B, the reflection properties are evaluated by changing the frequency of incident electromagnetic waves.

Embodiment 1

The structure of FIG. 13A is used here, that is, a structure in which the PVC cover 112A, which is 5.0-mm thick and 60-mm wide, is placed outside the aluminum frame 111A, which is 5.0-mm thick and 60-mm wide, and in which the gap G1 of the hollow 114 is 5.5 mm and the width of the hollow 114 is 20 mm. The edges of the cover 112A are chamfered with a radius of curvature R of 2 mm. An electromagnetic wave with a frequency of 3.8 GHz is incident on the panel 13, and the main peak of RCS (radar cross-section) is calculated by changing the incident angle from 0° to 60° in increments of 10°. The incident angle of 0° is normal incidence on the panel surface. The peak ratio is calculated by using the RCS main peaks, which are calculated per incident angle, and one panel's RCS main peaks at respective incident angles, which are obtained in advance. Table 1 shows the calculation results.

TABLE 1

| Incident Angle [°] | 0 | 10 | 20 | 30 | 40 | 50 | 60 |
|---|---|---|---|---|---|---|---|
| Peak Ratio | 0.83 | 0.85 | 0.85 | 0.92 | 0.88 | 0.92 | 0.86 |

The structure of FIG. 13A exhibits high peak ratios equal to 0.83 or greater, over incident angles ranging from 0° to 60°, in response to electromagnetic waves of 3.8 GHz.

Embodiment 2

The structure of FIG. 13B is used here, that is, a structure in which the PVC cover 112B is placed outside the frame 111B with wings 115, and in which the gap G2 of the hollow 114 is 6.0 mm. An electromagnetic wave with a frequency of 3.8 GHz is incident on the panel 13, the main peak of RCS (Radar Cross-Section) is calculated by changing the incident angle from 0° to 60° in increments of 10°, and the peak ratios to one panel's RCS main peaks are calculated. Table 2 shows the calculation results.

TABLE 2

| Incident Angle [°] | 0 | 10 | 20 | 30 | 40 | 50 | 60 |
|---|---|---|---|---|---|---|---|
| Peak Ratio | 0.84 | 0.84 | 0.82 | 0.87 | 0.84 | 0.88 | 0.78 |

The structure of FIG. 13B exhibits high peak ratios equal to 0.78 or greater, over incident angles ranging from 0° to 60°, in response to electromagnetic waves of 3.8 GHz.

Embodiment 3

Embodiment 3 uses the structure of FIG. 13A, except that the frequency of incident electromagnetic waves is changed to 28 GHz. The incident angle of 28-GHz electromagnetic waves is changed from 0° to 60° in increments of 10°, and the intensity ratios of the main peaks of the radar cross-section are calculated. Table 3 shows the calculation results.

TABLE 3

| Incident Angle [°] | 0 | 10 | 20 | 30 | 40 | 50 | 60 |
|---|---|---|---|---|---|---|---|
| Peak Ratio | 0.64 | 0.54 | 0.69 | 0.71 | 0.53 | 0.11 | 0.13 |

The structure of FIG. 13A exhibits peak ratios equal to 0.53 or greater, over incident angles ranging from 0° to 40°, in response to electromagnetic waves of 28 GHz. The reason that the peak ratio decreases beyond 50° is that, depending on the incident angle and the frequency of the electromagnetic wave, the reflected wave that is formed when the surface wave having propagated through the PVC cover 112A, which is in close contact with the aluminum frame 111A, is radiated from the end point works to weaken the wave reflected by the panel, that is, gives a destructive reflection. The phase of the reflected wave when the surface wave propagates through the PVC and is radiated from the end point depends on the dielectric constant and thickness of the PVC, the width of the frame 111A, and the frequency, so that the decrease in the peak ratio when the incident angle is large can be solved by selecting other insulating materials according to the target frequency, the frame structure (including the size), and so forth.

Embodiment 4

Embodiment 4 uses the structure of FIG. 13B, except that the frequency of incident electromagnetic waves is changed to 28 GHz. The incident angle of 28-GHz electromagnetic waves is changed from 0° to 60° in increments of 10°, and the intensity ratios of the main peaks of the radar cross-section are calculated. Table 4 shows the calculation results.

TABLE 4

| Incident Angle [°] | 0 | 10 | 20 | 30 | 40 | 50 | 60 |
|---|---|---|---|---|---|---|---|
| Peak Ratio | 0.58 | 0.49 | 0.59 | 0.59 | 0.44 | 0.13 | 0.16 |

The structure of FIG. 13B exhibits peak ratios equal to 0.44 or greater, over incident angles ranging from 0° to 40°, in response to electromagnetic waves of 28 GHz. The reason that the peak ratio decreases beyond 50° is that, as with embodiment 3, depending on the incident angle and the frequency of the electromagnetic wave, the reflected wave from the panel and the reflected wave that propagates on the PVC surface and is radiated from the end point interfere with each other in a destructive manner. The decrease in reflection properties at incident angles equal to 50° or greater is less than in embodiment 3 because the frame 111B is provided with the wings 115.

Embodiment 5

Embodiment 5 uses the structure of FIG. 13A, except that the frequency of incident electromagnetic waves is changed to 24 GHz. The incident angle of 24-GHz electromagnetic waves is changed from 0° to 60° in increments of 10°, and the intensity ratios of the main peaks of the radar cross-section are calculated. Table 5 shows the calculation results.

TABLE 5

| Incident Angle [°] | 0 | 10 | 20 | 30 | 40 | 50 | 60 |
|---|---|---|---|---|---|---|---|
| Peak Ratio | 0.93 | 0.83 | 0.90 | 0.82 | 0.33 | 0.33 | 0.71 |

The structure of FIG. 13A exhibits high peak ratios equal to 0.82 or higher, in response to an electromagnetic wave of 24 GHz, in the range of 0° to 30° and a peak ratio as high as 0.71 is obtained even at 60°. Although the peak ratio decreases at 40° and 50°, the overall reflection properties are good.

Embodiment 6

Embodiment 6 uses structure of FIG. 13B, except that the frequency of incident electromagnetic waves is changed to 24 GHz. The incident angle of 24-GHz electromagnetic waves is changed from 0° to in increments of 10°, and the intensity ratios of the main peaks of the radar cross-section are calculated. Table 6 shows the calculation results.

TABLE 6

| Incident Angle [°] | 0 | 10 | 20 | 30 | 40 | 50 | 60 |
|---|---|---|---|---|---|---|---|
| Peak Ratio | 0.87 | 0.80 | 0.86 | 0.77 | 0.33 | 0.04 | 0.08 |

The structure of FIG. 13B exhibits high peak ratios equal to 0.77 or higher, over incident angles ranging from 0° to 30°, in response to a 24-GHz electromagnetic wave. Although the peak ratio decreases between 40° and 60°, good reflection properties can still be exhibited in an environment in which the incident angle is 40° or greater, preferably 30° or greater.

Embodiment 7

Embodiment 7 uses the structure of FIG. 13A, except that the frequency of incident electromagnetic waves is changed to 26 GHz. The incident angle of 26-GHz electromagnetic waves is changed from 0° to 60° in increments of 10°, and the intensity ratios of the main peaks of the radar cross-section are calculated. Table 7 shows the calculation results.

TABLE 7

| Incident Angle [°] | 0 | 10 | 20 | 30 | 40 | 50 | 60 |
|---|---|---|---|---|---|---|---|
| Peak Ratio | 0.62 | 0.74 | 0.72 | 0.77 | 0.42 | 0.24 | 0.28 |

The structure of FIG. 13A exhibits peak ratios equal to 0.42 or higher, over incident angles ranging from 0° to 40°, in response to electromagnetic waves of 26 GHz. Although the peak ratio decreases at 50° and 60°, the overall reflection properties are acceptable.

Embodiment 8

Embodiment 8 uses the structure of FIG. 13B, except that the frequency of incident electromagnetic waves is changed to 26 GHz. The incident angle of 26-GHz electromagnetic waves is changed from 0° to 60° in increments of 10°, and the intensity ratios of the main peaks of the radar cross-section are calculated. Table 8 shows the calculation results.

TABLE 8

| Incident Angle [°] | 0 | 10 | 20 | 30 | 40 | 50 | 60 |
|---|---|---|---|---|---|---|---|
| Peak Ratio | 0.54 | 0.68 | 0.62 | 0.71 | 0.40 | 0.06 | 0.10 |

The structure of FIG. 13B exhibits peak ratios equal to 0.40 or higher, over incident angles ranging from 0° to 40°, in response to electromagnetic waves of 26 GHz. Although the peak ratio decreases at 50° and 60°, the overall reflection properties are in an acceptable range.

Evaluation of Comparative Examples

Figure 14:
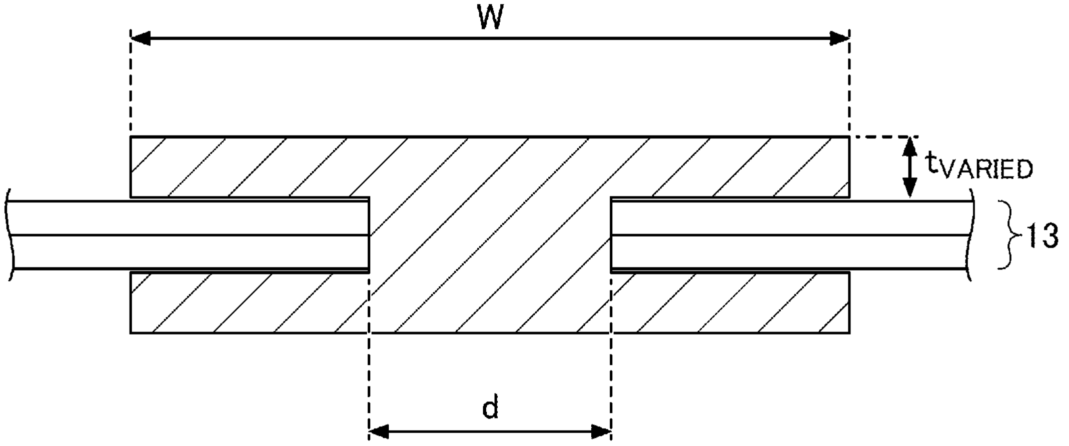
FIG. 14 is a diagram that shows a simulation model according to a comparative example.

FIG. 14 is a diagram that shows a simulation model of a comparative example. This comparative example uses an aluminum frame having a shape of the letter H, with no hollow. The width "W" of the frame is fixed at 50 mm, and the thickness "$t_{VARIED}$" is varied in the range of 10 mm to 30 mm. By changing the thickness, the total thickness at the center part of the frame also changes. The distance "d" between the slits in the width direction is 20 mm. The depth and size of the slits and the structure of the panel 13 are the same as in the simulation models of FIG. 13A and FIG. 13B. The reflection properties are evaluated based on peak ratios, as in embodiments 1 to 8.

Comparative Example 1

In comparative example 1, the aluminum frame is thick, and its width "W" is 50 mm. The frame's thickness 10 mm is the sum of the thicknesses of the aluminum frame 111 and the thickness of the PVC cover 112 of embodiments 1 to 8. The frequency of incident electromagnetic wave is set to 3.8 GHz. The incident angle of 3.8-GHz electromagnetic waves is changed from 0° to 60° in increments of 10°, and the intensity ratios of the main peaks of the radar cross-section are calculated. Table 9 shows the calculation results.

TABLE 9

| Incident Angle [°] | 0 | 10 | 20 | 30 | 40 | 50 | 60 |
|---|---|---|---|---|---|---|---|
| Peak Ratio | 0.65 | 0.72 | 0.71 | 0.84 | 0.77 | 0.88 | 0.78 |

The structure of comparative example 1 exhibits peak ratios equal to 0.65 or higher, over incident angles ranging from 0° to 60°, in response to electromagnetic waves of 3.8 GHz. However, the reflection properties are poor compared to the results of embodiment 1 (Table 1) and embodiment 2 (Table 2), in which electromagnetic waves of the same frequency (3.8 GHz) are used.

Comparative Example 2

In comparative example 2, the aluminum frame is thick, and its width "W" is 50 mm. As in comparative example 1, the incident angle of 3.8-GHz electromagnetic waves is changed from 0° to 60° in increments of 10°, and the intensity ratios of the main peaks of the radar cross-section are calculated. Table 10 shows the calculation results.

TABLE 10

| Incident Angle [°] | 0 | 10 | 20 | 30 | 40 | 50 | 60 |
|---|---|---|---|---|---|---|---|
| Peak Ratio | 0.58 | 0.63 | 0.58 | 0.71 | 0.63 | 0.77 | 0.64 |

The structure of comparative example 2 exhibits peak ratios equal to 0.58 or higher, over incident angles ranging from 0° to 60°, in response to electromagnetic waves of 3.8 GHz. However, the reflection properties are poor compared to the results of embodiment 1 (Table 1) and embodiment 2 (Table 2), in which electromagnetic waves of the same frequency (3.8 GHz) are used. As to the comparison with comparative example 1, it is likely that doubling the thickness of the aluminum frame resulted in a slight increase in the attenuation of the incident electromagnetic wave.

Comparative Example 3

In comparative example 3, the aluminum frame is 30-mm thick, and its width "W" is 50 mm. Similar to comparative examples 1 and 2, the incident angle of 3.8-GHz electromagnetic waves is changed from 0° to 60° in increments of 10°, and the intensity ratios of the main peaks of the radar cross-section are calculated. Table 11 shows the calculation results.

TABLE 11

| Incident Angle [°] | 0 | 10 | 20 | 30 | 40 | 50 | 60 |
|---|---|---|---|---|---|---|---|
| Peak Ratio | 0.87 | 0.88 | 0.79 | 0.82 | 0.70 | 0.76 | 0.61 |

The structure of comparative example 3 exhibits peak ratios equal to 0.61 or higher, over incident angles ranging from 0° to 60°, in response to electromagnetic waves of 3.8 GHz. However, the reflection properties are poor compared to the results of embodiment 1 (Table 1) and embodiment 2 (Table 2), in which electromagnetic waves of the same frequency (3.8 GHz) are used. The reason that the peak ratio is larger than comparative examples 1 and 2 depending on the incident angle may be that, because the frame's thickness was made 30 mm and brought closer to ½ of the wavelength of the incident electromagnetic wave, the waves strengthened each other depending on the incident angle, and increased the RCS peak intensity.

Comparative Example 4

In comparative example 4, the aluminum frame is thick, and its width “W” is 50 mm. The frequency of the incident electromagnetic wave is changed to 28 GHz. The incident angle of 28-GHz electromagnetic waves is changed from 0° to 60° in increments of 10°, and the intensity ratios of the main peaks of the radar cross-section are calculated. Table 12 shows the calculation results.

TABLE 12

| Incident Angle [°] | 0 | 10 | 20 | 30 | 40 | 50 | 60 |
|---|---|---|---|---|---|---|---|
| Peak Ratio | 0.46 | 0.25 | 0.13 | 0.10 | 0.39 | 0.63 | 0.12 |

Although a peak ratio of 0.46 is obtained upon normal incidence and a peak ratio of 0.63 is obtained at an incident angle of 50°, the other peak ratios are low, and the reflection properties are poor compared to embodiment 3 (Table 3) and embodiment 4 (Table 4), in which incident electromagnetic waves of the same frequency (28 GHz) are used. The reason the peak ratio is high at an incident angle of 50° may be that, because the frame’s thickness is 10 mm and close to the wavelength of the incident electromagnetic wave of 28 GHz, incident electromagnetic waves strengthened each other depending on the incident angle, and increased the RCS peak intensity.

Comparative Example 5

In comparative example 5, the aluminum frame is 20 mm thick, and its width “W” is 50 mm. As in comparative example 4, the incident angle of 28-GHz electromagnetic waves is changed from 0° to 60° in increments of 10°, and the intensity ratios of the main peaks of the radar cross-section are calculated. Table 13 shows the calculation results.

TABLE 13

| Incident Angle [°] | 0 | 10 | 20 | 30 | 40 | 50 | 60 |
|---|---|---|---|---|---|---|---|
| Peak Ratio | 0.27 | 0.15 | 0.26 | 0.59 | 0.16 | 0.37 | 0.06 |

Although a peak ratio of 0.59 is obtained when the incident angle is 30°, the other peak ratios are low, and the reflection properties are poor compared to embodiment 3 (Table 3) and embodiment 4 (Table 4), in which incident electromagnetic waves of the same frequency (28 GHz) are used.

Comparative Example 6

In comparative example 6, the aluminum frame is 30-mm thick, and its width “W” is 50 mm. Similar to comparative examples 4 and 5, the incident angle of 28-GHz electromagnetic waves is changed from 0° to 60° in increments of 10°, and the intensity ratios of the main peaks of the radar cross-section are calculated. Table 14 shows the calculation results.

TABLE 14

| Incident Angle [°] | 0 | 10 | 20 | 30 | 40 | 50 | 60 |
|---|---|---|---|---|---|---|---|
| Peak Ratio | 0.15 | 0.21 | 0.55 | 0.21 | 0.40 | 0.07 | 0.05 |

Although a peak ratio of 0.55 is obtained when the incident angle is 20°, the other peak ratios are low, and the reflection properties are poor compared to embodiment 3 (Table 3) and embodiment 4 (Table 4), in which incident electromagnetic waves of the same frequency (28 GHz) are used.

Comparative Example 7

In comparative example 7, the aluminum frame is thick, and its width “W” is 50 mm. The frequency of the incident electromagnetic wave is changed to 24 GHz. The incident angle of 28-GHz electromagnetic waves is changed from 0° to 60° in increments of 10°, and the intensity ratios of the main peaks of the radar cross-section are calculated. Table 15 shows the calculation results.

TABLE 15

| Incident Angle [°] | 0 | 10 | 20 | 30 | 40 | 50 | 60 |
|---|---|---|---|---|---|---|---|
| Peak Ratio | 0.52 | 0.44 | 0.54 | 0.75 | 0.57 | 0.21 | 0.05 |

Although peak ratios equal to 0.44 or higher are obtained at incident angles ranging from 0° to 40°, the reflection properties are poor compared to embodiment 5 (Table 5) and embodiment 6 (Table 6), in which incident electromagnetic waves of the same frequency (24 GHz) are used.

Comparative Example 8

In comparative example 8, the aluminum frame is 20-mm thick, and its width “W” is 50 mm. Similar to comparative example 7, the incident angle of 24-GHz electromagnetic waves is changed from 0° to 60° in increments of 10°, and the intensity ratios of the main peaks of the radar cross-section are calculated. Table 16 shows the calculation results.

TABLE 16

| Incident Angle [°] | 0 | 10 | 20 | 30 | 40 | 50 | 60 |
|---|---|---|---|---|---|---|---|
| Peak Ratio | 1.12 | 0.87 | 0.60 | 0.13 | 0.44 | 0.16 | 0.14 |

Peak ratios equal to 0.6 or higher are obtained at incident angles ranging from 0° to 20°, and the peak ratio upon normal incidence is 1.12. Looking only at the peak ratios at 0° and 10°, these peaks ratios are higher than in embodiment 5 (Table 5) and embodiment 6 (Table 6) for an incident electromagnetic wave of the same frequency (24 GHz); nevertheless, looking at the peak ratios over the whole range from 0° to 60°, the reflection properties of embodiment 5 and embodiment 6 are better.

Comparative Example 9

In comparative example 9, the aluminum frame is 30-mm thick, and its width “W” is 50 mm. Similar to comparative examples 7 and 8, the incident angle of 24-GHz electromagnetic waves is changed from 0° to 60° in increments of 10°, and the intensity ratios of the main peaks of the radar cross-section are calculated. Table 17 shows the calculation results.

TABLE 17

| Incident Angle [°] | 0 | 10 | 20 | 30 | 40 | 50 | 60 |
|---|---|---|---|---|---|---|---|
| Peak Ratio | 0.31 | 0.22 | 0.43 | 0.53 | 0.11 | 0.11 | 0.18 |

Although peak ratios equal to 0.43 or higher are barely obtained at incident angles of 20° and 30°, the other peak ratios are low, and the reflection properties are poor compared to embodiment 5 (Table and embodiment 6 (Table 6), in which incident electromagnetic waves of the same frequency (24 GHz) are used.

Comparative Example 10

In comparative example 10, the aluminum frame is 10-mm thick, and its width "W" is 50 mm. The frequency of the incident electromagnetic wave is changed to 26 GHz. The incident angle of 26-GHz electromagnetic waves is changed from 0° to 60° in increments of 10°, and the intensity ratios of the main peaks of the radar cross-section are calculated. Table 18 shows the calculation results.

TABLE 18

| Incident Angle [°] | 0 | 10 | 20 | 30 | 40 | 50 | 60 |
|---|---|---|---|---|---|---|---|
| Peak Ratio | 0.29 | 0.30 | 0.21 | 0.45 | 0.61 | 0.43 | 0.07 |

Although peak ratios equal to 0.43 or higher are obtained at incident angles ranging from 30° to 50°, looking at the whole range from 0° to 60°, embodiment 7 (Table 7) and embodiment 8 (Table 8) show better reflection properties in response to incident electromagnetic waves of the same frequency (26 GHz).

Comparative Example 11

In comparative example 11, the aluminum frame is 20-mm thick, and its width "W" is 50 mm. As in comparative example 10, the incident angle of 24-GHz electromagnetic waves is changed from 0° to 60° in increments of 10°, and the intensity ratios of the main peaks of the radar cross-section are calculated. Table 19 shows the calculation results.

TABLE 19

| Incident Angle [°] | 0 | 10 | 20 | 30 | 40 | 50 | 60 |
|---|---|---|---|---|---|---|---|
| Peak Ratio | 0.49 | 0.68 | 0.75 | 0.52 | 0.13 | 0.39 | 0.14 |

Although peak ratios equal to 0.49 or higher are obtained at incident angles ranging from 0° to 40°, looking at the whole range from 0° to 60°, embodiment 7 (Table 7) and embodiment 8 (Table 8) show better reflection properties in response to incident electromagnetic waves of the same frequency (26 GHz).

Comparative Example 12

In comparative example 12, the aluminum frame is 30-mm thick, and its width "W" is 50 mm. Similar to comparative examples 10 and 11, the incident angle of 26-GHz electromagnetic waves is changed from 0° to 60° in increments of 10°, and the intensity ratios of the main peaks of the radar cross-section are calculated. Table 20 shows the calculation results.

TABLE 20

| Incident Angle [°] | 0 | 10 | 20 | 30 | 40 | 50 | 60 |
|---|---|---|---|---|---|---|---|
| Peak Ratio | 0.82 | 0.97 | 0.24 | 0.30 | 0.19 | 0.29 | 0.06 |

Although high peak ratios are obtained when the incident angle is 0° and 10°, the peak ratios at the other angles are low. Looking at the whole range from 0° to 60°, embodiment 7 (Table 7) and embodiment 8 (Table 8) show more stable reflection properties in response to incident electromagnetic waves of the same frequency (26 GHz).

From the above results, the structures of the embodiments show better reflection properties than the structures of the comparative examples. In the simulation results in which the frequency is 24 GHz, 26 GHz, and 28 GHz, some comparative examples show higher peak ratios depending on the incident angle. The reason for this may be that, in some of the embodiments, surface wave that have propagated on the PVC surface and are radiated from the end point act destructively against the reflected waves on the panel surface. The reason may be also that, at the same time, depending on the thickness of the aluminum frame in the comparative examples, resonation with the wavelength of the incident electromagnetic wave might cause reinforced reflection.

Strength Analysis of Frame

Figure 15:
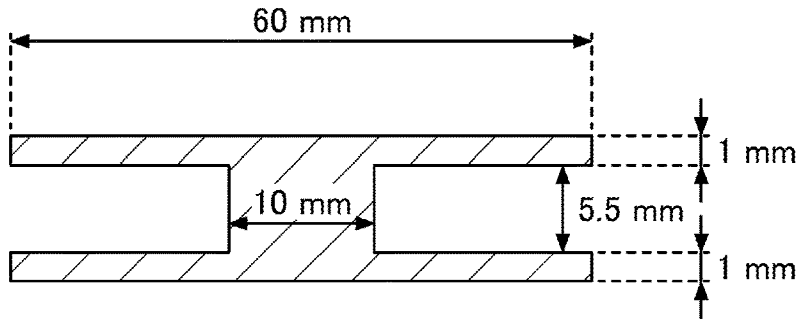
FIG. 15 is a diagram that shows an analytical structure for evaluating the strength of a support.
Figure 15:
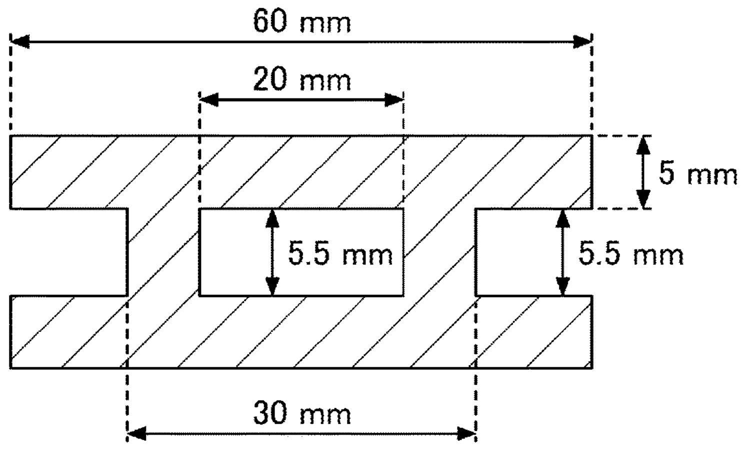
Figure 15:
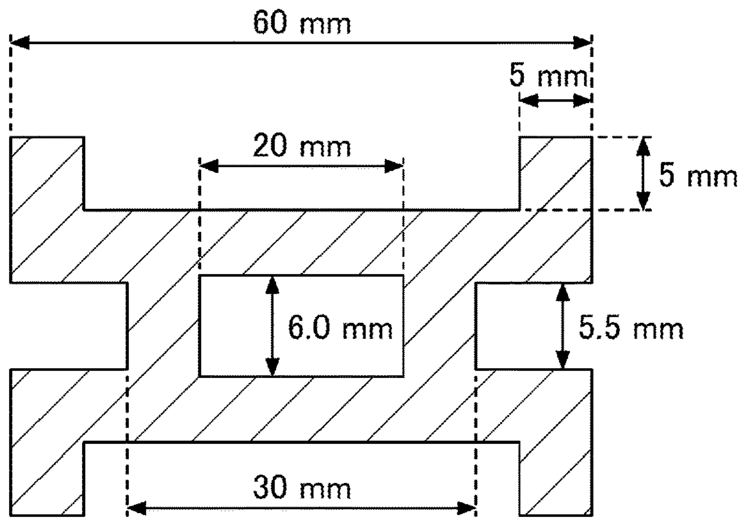

Next, the frame structure of the embodiments will be examined from the perspective of the strength or rigidity of the frame. FIG. 15 shows an analytical structural model for use for strength analysis. The width of the frame is 60 mm throughout the analytical structures 1 to 3.

The analytical structure 1, shown in FIG. 15A, is a reference structure, and is an aluminum frame with a shape of the letter H, without a hollow. The size of each slit is 5.5 mm, the thickness of the frame in parts where the slits are formed is 1 mm, and the width of the central part, that is, the distance between the slits on both sides, is 10 mm.

The analytical structure 2, shown in FIG. 15B, corresponds to the frame 111A used in the support 11A of FIG. 5A. The frame is 5-mm thick, the size of the slits on both sides and the hollow is 5.5 mm, each slit is 15-mm deep, the hollow is 20-mm wide, and the distance between the slits is 30 mm.

The analytical structure 3, shown in FIG. 15C, corresponds to the frame 111B used in the support 11B of FIG. 5B. The frame is 5-mm thick, the size of the slits on both sides is 5.5 mm, each slit is 15-mm deep, the size and width of the hollow are 6.0 mm and 20, respectively, the distance between the slits is 30 mm, and the height of the wings that extend outward from the slits is 5 mm.

The conditions of analysis are as follows:

Fixing method: both ends of the beam are fixed, load is applied intensively to the center, and the amount of deflection, δ, at the center is calculated;

Beam length L: 2,000 mm;

Load F: two loads of 50 Kg and 90 Kg are applied;

Young's modulus (E) of member (Al): 72,000 MPz;

Density ρ: $2.7\times10^{-6}$ Kg/mm$^3$;

Cross-sectional area A: depends on the structure;
Moment of inertia of area I: depends on the structure; and
Section modulus Z [$cm^3$]: depends on structure.

Here, the beam length L is the length when both ends of the frame 111 in the height h direction are fixed (see FIG. 3).

The section modulus Z represents the degree of bending strength of the cross-section of the member, and the larger the numerical value, the greater the bending strength of the cross-section. Based on the above parameters, the amount of deflection δ1 due to the load applied and the amount of deflection δ2 due to the structure's own weight are calculated.

$$\delta 1=(F \times L3)/(192 \times E \times I)$$

$$\delta 2=(w \times L4)/(384 \times E \times I)$$

Here, w is the weight of the member, determined by multiplying the density ρ, the gravity g, and the cross-sectional area A (ρ×g×A). The amount of deflection δ is the sum of δ1 and δ2 (δ=δ1+δ2). The smaller the amount of deflection, the higher the rigidity and mechanical strength.

FIG. 16 shows analysis results of frame strength. Both when the load is 50 Kg and when the load is 90 Kg, the amount of deflection is significantly small in the analytical structures 2 and 3, which are embodiments, compared to the analytical structure 1, which is a comparative example. Moreover, reduction of weight is achieved by having a hollow.

It is clear, from the strength analysis results of FIG. 16, that the support 11 of the embodiments has substantially greater cross-sectional bending strength and rigidity than the reference structure, has excellent mechanical strength, and can hold the panel 13 stably. Also, as can be seen from the evaluation of reflection properties described hereinabove, the support 11 of the embodiments shows stable reflection properties in response to incident electromagnetic waves of the 3.8 GHz band and 24 to 27 GHz, over incident angles ranging from 0° to 60°.

The electromagnetic wave reflector 10 using the support 11 according to the embodiments has excellent reflection properties, is structurally stable, and can be used indoors and outdoors. The electromagnetic wave reflector according to the embodiments can be used as an indoor and outdoor wall material, a partition, a fence, and so forth. The electromagnetic wave reflector 10 using the support 11 according to the embodiments can be used as: an interior wall of buildings such as factories, an exterior wall of buildings, a soundproof wall of highways, and a wall material for warehouses and parking lots; a fence in factories, construction sites, and for agriculture; a partition at nursing care facilities, medical sites, event venues, commercial facilities, offices; and so forth.

Each electromagnetic wave reflector 10 may be transported with supports 11 attached to both sides of the panel 13, as shown in FIG. 3, or the panel 13 and the supports 11 may be transported separately and assembled at the installation site. When the reflected electromagnetic wave fence 100 is formed by joining multiple panels 13 together, the panels 13 and the supports 11 may be transported separately, or the panels 13 and the supports 11 may be transported such that the supports 11 are attached to one end part of each panel 13 and the other end part of each panel 13 is covered with a protective jacket or the like. In either case, they can be assembled at the installation site. Moreover, as in FIG. 8 and FIG. 9B, the position of the meta reflector 102 on the panel 13 may be determined at the installation site of the electromagnetic wave reflector 10. The structure of the meta reflector 102 that can move on the surface of the panel 13 may be applied to a reflected electromagnetic wave fence 100A that uses freestanding supports 12.

The shape and dimensions of the support 11 are not limited to the examples shown in the embodiments, and may be designed as appropriate depending on the size, weight, installation environment, and so forth of the panel, as long as the mechanical strength of the frame is retained, and the reference potential of reflection on the reflecting surface keeps its continuity.

The invention claimed is:

1. An electromagnetic wave reflector comprising:
a panel having a reflecting surface and configured to reflect a radio wave of a desired band selected from frequency bands ranging from 1 GHz to 170 GHz; and
a support supporting the panel,
wherein the support has a conductive frame and a non-conductive cover that covers at least part of the frame, and
wherein the frame has a slit and a hollow, the slit receiving an end part of the panel, and the hollow being independent of the slit.

2. The electromagnetic wave reflector according to claim 1, wherein the frame has, on both sides thereof in a width direction, a first slit and a second slit, and has the hollow between the first slit and the second slit.

3. The electromagnetic wave reflector according to claim 2, wherein the frame, at end parts thereof in a width direction, has wings that extend outward with respect to the slits.

4. The electromagnetic wave reflector according to claim 1, wherein the cover covers at least part of an outer surface of the frame.

5. The electromagnetic wave reflector according to claim 3, wherein the cover is placed between the wings provided at both sides of the slits in a width direction.

6. The electromagnetic wave reflector according to claim 5, wherein the cover is resin or an adhesive layer that is transparent to a wavelength that is used.

7. The electromagnetic wave reflector according to claim 1,
wherein the support has a base and a pillar that extends vertically from the base,
wherein the pillar is formed with the frame and the cover, and
wherein the support allows the panel to be erect with respect to a surface on which the electromagnetic wave reflector is installed.

8. A reflected electromagnetic wave fence, wherein a plurality of electromagnetic wave reflectors according to claim 1 are connected by using the support.

9. A method of assembling an electromagnetic wave reflector, the method comprising:
mechanically connecting a first panel and a second panel by using a support,
the first panel having a first reflecting surface and configured to reflect a radio wave of a desired band selected from frequency bands ranging from 1 GHz to 170 GHz,
the second panel having a second reflecting surface and configured to reflect the radio wave of the desired band, and
the support having a non-conductive cover on a surface thereof; and
making a reference potential of reflection continuous between the first reflecting surface and the second reflecting surface by using a conductive frame that is provided inside the non-conductive cover of the support.

10. The method according to claim 9, wherein at least one of the first panel or the second panel has a meta surface, whose reflection properties are subject to control, on the first reflecting surface or the second reflecting surface, and wherein a position of the meta surface on the panel is determined at a site where the electromagnetic wave reflector is installed.

* * * * *